(12) United States Patent
Huijbers et al.

(10) Patent No.: US 9,519,447 B2
(45) Date of Patent: Dec. 13, 2016

(54) APPARATUS AND METHOD FOR DETERMINING SUITABLE PRINTING CONDITIONS FOR PRINTING SHEETS IN A PRINTING SYSTEM

(71) Applicant: OCE-TECHNOLOGIES B.V., Venlo (NL)

(72) Inventors: Jeroen P. J. Huijbers, Venlo (NL); Johannes P. J. C. Rooijakkers, Venlo (NL); Daisuke Kawaguchi, Venlo (NL); Hendricus F. M. Jeurissen, Venlo (NL); Catharinus Van Acquoij, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/877,423

(22) Filed: Oct. 7, 2015

(65) Prior Publication Data

US 2016/0103633 A1 Apr. 14, 2016

(30) Foreign Application Priority Data

Oct. 8, 2014 (EP) .................................. 14188100

(51) Int. Cl.
*G06F 3/12* (2006.01)
*H04N 1/00* (2006.01)
(Continued)

(52) U.S. Cl.
CPC ............ *G06F 3/121* (2013.01); *B41J 13/0009* (2013.01); *G06F 3/1234* (2013.01); *G06K 15/16* (2013.01);
(Continued)

(58) Field of Classification Search
None
See application file for complete search history.

(56) References Cited

U.S. PATENT DOCUMENTS

| 5,654,799 A | * | 8/1997 | Chase | ..................... G01N 21/86 356/429 |
| 2004/0100016 A1 | * | 5/2004 | Lay | ......................... B65H 29/60 271/225 |

(Continued)

FOREIGN PATENT DOCUMENTS

| EP | 0 816 931 A1 | 1/1998 |
| JP | 10-194585 A | 7/1998 |
| JP | 2001-124702 A | 5/2001 |

*Primary Examiner* — Bradley Thies
(74) *Attorney, Agent, or Firm* — Birch, Stewart, Kolasch & Birch, LLP

(57) ABSTRACT

The present invention provides a method of optimizing the operating conditions for printing sheets, comprising the following steps: introducing a sheet into the printing system; treating the sheet by exposing the sheet to a physical operating condition of the printing system at a predetermined level; sensing a surface geometry of the exposed sheet to generate data representing a height map of the surface of the at least one exposed sheet for that predetermined level of that operating condition; and comparing the data to one another and/or a reference value to determine the suitable level of the least one physical operating condition. The invention further provides an apparatus optimizing the operating conditions for printing sheets.

14 Claims, 7 Drawing Sheets

(51) Int. Cl.
*B41J 13/00* (2006.01)
*G06K 15/16* (2006.01)
*G03G 15/00* (2006.01)
(52) U.S. Cl.
CPC ...... *H04N 1/00092* (2013.01); *H04N 1/00633* (2013.01); *G03G 15/5029* (2013.01)

(56) References Cited

U.S. PATENT DOCUMENTS

| | | | | |
|---|---|---|---|---|
| 2005/0200918 A1* | 9/2005 | Muller | .................. | G06T 7/0073 358/496 |
| 2006/0275045 A1* | 12/2006 | Kawasaki | .......... | G03G 15/5029 399/45 |
| 2014/0054845 A1* | 2/2014 | Morikawa | ................ | B65H 5/00 271/18 |
| 2014/0092159 A1 | 4/2014 | de Jong et al. | | |

* cited by examiner

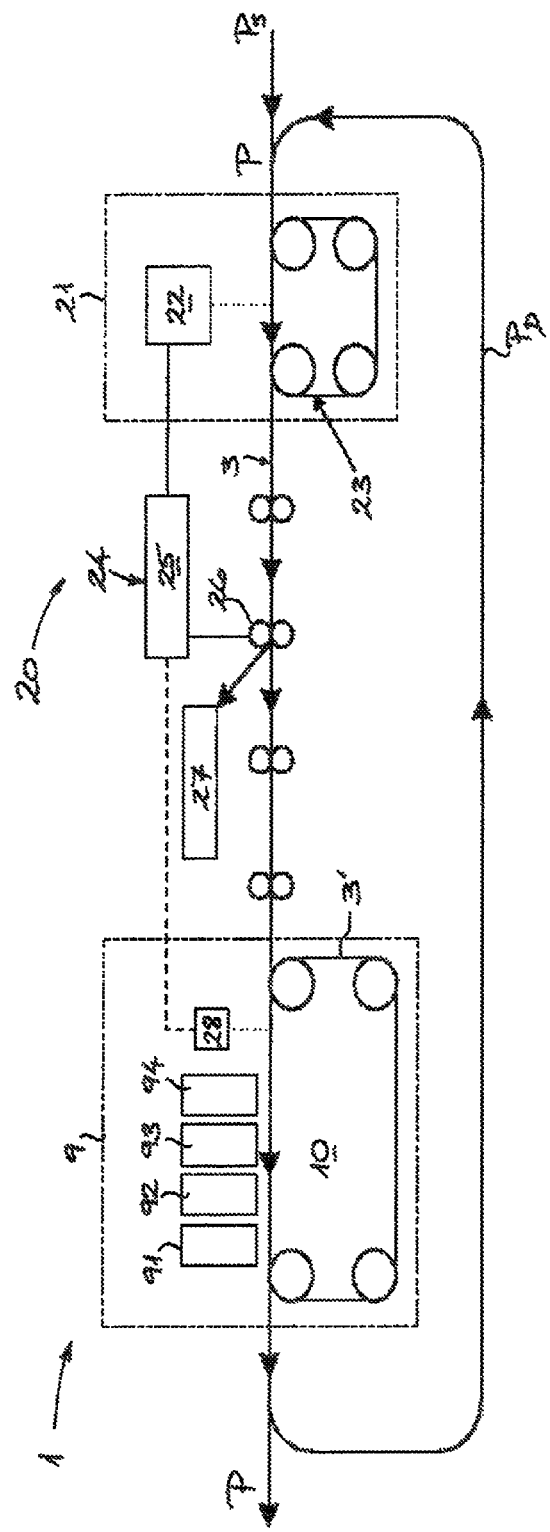
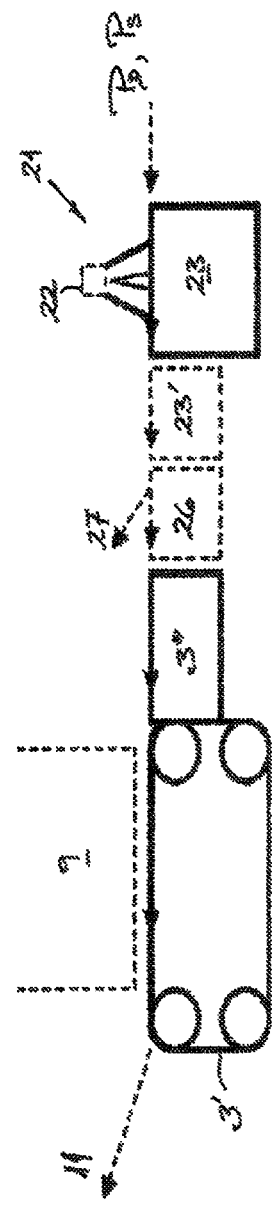
Fig. 4
Fig. 5

APPARATUS AND METHOD FOR DETERMINING SUITABLE PRINTING CONDITIONS FOR PRINTING SHEETS IN A PRINTING SYSTEM

FIELD OF THE INVENTION

The present invention relates to an apparatus and method for optimizing handling and/or printing of sheets in a printing system, such as an inkjet printing system. The invention also relates to a printing system that includes such an apparatus to improve and/or optimize productivity and runability of the system.

BACKGROUND OF THE INVENTION

One or more deformations present within a sheet of a medium to be printed can cause serious reliability problems in a printing system, such as an inkjet printing system, where there is only a small gap between a sheet transport mechanism and an image forming device or printing head of the printing system. If the sheet to be printed touches the image forming device or the printing head as a result of such a deformation, this can lead to print quality degradation and/or to a sheet jam in the machine. To achieve high print quality in an inkjet printing system, the distance between the printing heads and sheet to be printed should be kept small. Because of this small distance (print gap) the print heads are easily touched by the sheets as they pass. Accordingly, even small defects like dog ears, wrinkles, tears etc. can cause a so-called "head touch", which can degrade print quality, cause nozzle failure, or even sheet jams.

To address these issues, systems have been developed which employ a proofing device capable of identifying sheet deformations and rejecting sheets that contain such deformations. However, there are many sources of defects or errors that may degrade the productivity of a printing system. For example, sheets to be printed supplied to a printing machine may already contain various defects. Also, defects and wear within the machine can cause the sheets to become damaged. Changes in the environmental conditions can lead to deformation of the sheets as they are being processed, and inappropriate settings in a printing system, such as too much ink or a drying temperature that is too high or too low, can also generate problems. Furthermore, such influences or defects can act in combination, so making it very difficult to identify a root cause of a problem.

Drawback of the proofing methods according to the prior art is that they require the user to purchase more sheets than the number will actually be printed, due to sheets being deemed unsuitable for printing. In unfavourable conditions, these methods might reject large quantities of sheets or even the entire sheet stack intended for printing a print job. This results in high costs for an operator, as large numbers of additional sheets are required for completing the print job. For example, the print job prescribes a certain paper type prone to wrinkling. In the prior art the suitability testing devices may reject a large number of sheets of said paper type, because the wrinkles in certain sheets exceed a predetermined threshold value. Since the operator is unable to determine a root cause leading to the wrinkling, he or she is forced to keep supplying sheets until the job is finished. Thereby, the number of sheets input into the printing system may significantly exceed the number of sheets printed, as prescribed by the print job. This leads to additional costs, especially when the rejected or left over sheets cannot be used in a further print job.

US 2004\100016 A describes a media qualification device configured to sort media sheets according to one or more detected media characteristics into one of an unusable media path and at least one usable media path. The media qualification device may further comprise an input/output device configured to select media grade parameters.

SUMMARY OF THE INVENTION

In view of the above, an object of the present invention is to provide a new and improved apparatus and method for optimizing handling and/or printing of sheets to be printed in a printing system, such as an inkjet printer, and a printing system or machine including such an apparatus.

In accordance with the invention, a method as recited in claim 1, and an optimizing apparatus having the features recited in claim 12 are provided. Advantageous and/or preferred features of the invention are recited in the dependent claims.

It is the insight of the inventors that a suitable level of an operating condition may be determined by comparing the results of exposing a sheet to different levels of said operating condition to one another prior to printing. It is a further insight of the inventors, that by applying different levels of different operating conditions and comparing the height maps for each level of each operating parameter to the print head gap spacing the risk of head touch can be eliminated by selecting the suitable levels for each operating condition from levels corresponding to a maximum sheet height below the print head gap spacing.

In a first aspect the present invention provides a method suitable operating conditions for printing sheets in a printing system. The method comprises the steps of:
 introducing a at least one sheet into the printing system;
 treating the at least one sheet by exposing the at least one sheet to at least one physical operating condition of the printing system at at least one predetermined level;
 sensing a surface geometry of a surface of the at least one exposed sheet to generate data representing a height map of the surface of the at least one exposed sheet for the at least one predetermined level of the at least one physical operating condition; and
 comparing the data representing a height map of the surface of the at least one exposed sheet for the at least one predetermined level of the at least one physical operating condition to a reference to determine suitable operating conditions of the printing system.

In the method according to the present invention a sheet is introduced into the printing system. The sheet may be inserted from a sheet input module, wherein a plurality of sheets can be positioned. The sheet is then treated by exposing it to a level of a physical operating condition of the printing system. For example, the physical condition is a temperature in the sheet input module, which is set to the level of 40° C. The sheet may then be exposed to said operating condition at said level for a predetermined time to allow exposure to the operating condition to take effect on the sheet.

Exposure to the operating conditions can introduce deformations in the sheet. After treatment, the exposed sheet is sensed to measure the surface geometry or topology of the sheet's surface. As a result, data representing a height map of the surface of the sheet may be analyzed, for example for the presence of defects or deformations in the sheet. The maximum height of the sheet and/or for each detected deformation as a result of the exposure to the predetermined level of the operating condition may be determined.

By comparing the height map data of a sheet exposed to a level of an operating condition to a reference, the suitable operating conditions of the printing system can be determined. Since the sheet with said level of the physical operating condition has been sensed, the effect of said level of the physical operating condition on the sheet can be determined. For example, from the height map data the maximum sheet height and the deformations present in the sheet may be determined. By comparing this data for different levels of the operating parameters to the reference the suitable operating conditions may be selected, for example by selecting the level corresponding to the least number of deformations detected in the exposed sheet. Accordingly, the operating conditions of the printing system may then be adjusted to the determined suitable conditions. Thereby, the suitable print head gap spacing, sheet transport velocity, level of ink coverage, temperature, humidity etc., may be set to their respective suitable level.

The reference may be data related to a different level of the respective operating conditions, such that the level yielding the better suitability for printing may be determined by comparison. For example, two sheets exposed to different levels of an operating condition may be compared. Similarly, the reference may comprise data related to a plurality of different levels of the respective operating conditions, for example a plurality of sheets, each exposed to a different level of the plurality of different levels of the respective operating condition or conditions. As such, a curve plotting the data against the levels of the respective operating conditions may be obtained. Further, the reference may be a reference value or data set, relatively to which the suitability of the levels of the operating conditions may be determined. Additionally, the reference may comprise threshold values, by means of which certain levels of the operating conditions may be excluded.

As described above, the method according to the present invention provides an operator with feedback on the effects of the different levels of an operating condition applied to a sheet. Based on this feedback, the operator can adjust the level of the operating condition accordingly to adjust or optimize printing without the risk of head touch or the rejection of large quantities of sheets. By applying the suitable levels of the determined operating conditions, a sheet printed under said conditions is substantially guaranteed to be suitable for printing. Levels which resulted in the sheet being unsuitable for printing, as determined during comparison or sensing, may be eliminating by comparison to the at least one reference value, such as a threshold, range, bottom limit and/or upper limit.

The method according to the present invention distinguishes itself from the prior art in that it is allows for the comparison of height map data to enable the determination of the suitable levels for each operating condition. In the prior art no operating conditions are systematically varied, nor are height map data for different levels of an operating condition compared to one another.

The method according to the present invention is arranged for determining suitable operating conditions for printing sheets in a printing system. Preferably, the method according to the present invention determines the optimum operating conditions for printing sheets in a printing system. Optimizing or optimum implies here determining or selecting the operating conditions based on the level(s) yielding results approximating or corresponding to the preferences of an operator. The term optimizing thus may imply a sub-optimization or a selection based on the preferences of the operator. Basically, the method provides an operator with the levels for the operating conditions corresponding to his preferences.

In a preferred embodiment, the height map data of a sheet exposed to a level of an operating condition is compared to a reference, such that the suitable level for each physical printing condition of the printing system can be determined. Since the sheet with said level of the physical operating condition has been sensed, the effect of said level of the physical operating condition on the sheet can be determined. For example, from the height map data the maximum sheet height and the deformations present in the sheet may be determined. By comparing this data for different levels of the operating parameters to the reference the suitable level may be selected, for example by selecting the level corresponding to the least number of deformations detected in the exposed sheet.

Alternatively, the step of comparing the data comprises comparing the data representing a height map of the surface of the at least one exposed sheet for the at least one predetermined level of the at least one physical operating condition to a reference to determine a suitable level of a further physical operating condition. For example, for a pre-determined level of ink coverage, the maximum height of the sheet may be determined and the print head gap spacing adjusted accordingly to avoid "head touch". As such, the method allows for determining suitable operating conditions for printing sheets in a printing system, or even for optimizing of the operating conditions of the print head unit and/or the transport mechanism. Specifically, the suitable print head gap spacing, the print velocity, and/or the sheet transport velocity may be determined by exposing a sheet to a level of an operating condition.

In a further embodiment, preferred the step of comparing the data comprises comparing the data representing a height map of the surface of the at least one exposed sheet for the at least one predetermined level of the at least one physical operating condition to a reference to determine a suitable level of the least one physical operating condition. Basically, the operating conditions are systematically varied. The effects of each level of the operating condition on a sheet are then compared in order to determine the level of the operating condition best suited to printing.

In an embodiment, the method further comprises the steps of
treating the at least one sheet by exposing the at least one sheet to at least one physical operating condition of the printing system at least one further predetermined level; and
sensing the surface geometry of the at least one sheet further comprises sensing a surface geometry of a surface of the at least one exposed sheet to generate data representing a height map of the surface of the at least one exposed sheet for the at least one predetermined level and the at least one predetermined further level of the at least one physical operating condition; and
wherein the step of comparing the data further comprises comparing the data representing a height map of the surface of the at least one exposed sheet for the at least one predetermined level of the at least one physical operating condition to the data representing a height map of the surface of the at least one exposed sheet for the at least one predetermined further level of the at least one physical operating condition to determine the suitable level of the least one physical operating condition.

In the embodiment described above, the sheet is exposed to at least two levels of the at least one operating condition. The sheet can for example be printed with a plurality of squares or other shapes, each applied with a different level of ink coverage. The entire surface of the sheet may then be sensed in a single sensing step to obtain height data related to multiple levels of an operating condition or an operating parameter. In this case, the height map data for a level of an operating condition may correspond to a region or part of the surface of the sheet. Advantageously, only a single sensing step is required, since different levels of an operating condition can be applied to a single sheet on different regions of that sheet. The number of sheets for determining the suitable level can thus be reduced.

In a further embodiment, the method according to the present invention further comprises the steps of:
  introducing a at least one further sheet into the printing system;
  treating the at least one further sheet by exposing the at least one sheet to at least one physical operating condition of the printing system at least one predetermined further level;
  sensing a surface geometry of a surface of the at least one exposed further sheet to generate data representing a height map of the surface of the at least one exposed sheet for the at least one predetermined further level of the at least one physical operating condition; and
  comparing the data representing a height map of the surface of the at least one further exposed sheet for the at least one predetermined further level of the at least one physical operating condition to the data representing a height map of the surface of the at least one exposed sheet for the at least one predetermined level of the at least one physical operating condition to determine the suitable level of the least one physical operating condition.

In the above embodiment, at least two sheets are inserted into the printing system, wherein each sheet is exposed to one of at least two different levels of at least one operating condition. Each of the at least two sheets is exposed to a different level of one or each operating parameter. For example, the first sheet is heated to 50° C., while the second sheet is heated to 90° C. Each of the at least two sheets is sensed, resulting in two sets of height map data for a substantially full sheet surface. The data sets may then be analyzed to determine the suitability for printing for each of the at least two sheets. Preferably, this determination is based on the deformations detected in the sheet and/or their maximum height. The data for each of the at least two sheets are then compared to determine which sheet, and thereby which corresponding level of the operating condition, is better suited for printed. This may be done be comparing the number and/or classes of deformations detected in each data set as well as their maximum heights. In this embodiment, each sheet sensed corresponds to a level of an operating condition. Thereby, an accurate representation of the effect of each level of the operating condition on the sheet is obtained. As such, the method can accurately predict the suitable level by comparing the height map data of each of the sheets to one another.

In an embodiment, the method further comprises the step of storing the data representing a height map of the surface of the at least one exposed sheet for the at least one predetermined level of the at least one physical operating condition. The step of comparing the data further comprises comparing the data representing a height map of the surface of the at least one exposed sheet for the at least one predetermined level of the at least one physical operating condition to data stored in the step of storing the data. The height map data corresponding to each level for each of each operating condition is stored in a memory unit. The data may be stored in the raw format in which the height map was recorded, or in analyzed or processed form, such as tables or matrices describing the deformations detected and distribution over deformation classes or other relevant parameters, as well as the applied relevant levels for each of the operating conditions. Preferably, the stored data comprises print job information as well, for example sheet media material information. This has the advantage that an operator can consult previously performed determined or optimized printing conditions instead of performing the determination or optimization method according to the present invention. A sheet material type which has previously been determined or optimized need not be determined or optimized again via the method according the present invention when the memory unit has the relevant data stored.

In a further embodiment, the step of sensing the surface geometry of the at least one exposed sheet comprises determining the maximum sheet height of the exposed sheet for the at least one predetermined level of the at least one physical operating condition. The maximum sheet height may be determined for the region relevant to a level of an operating condition or of the entire sheet surface. Alternatively, the maximum height is determined per detected deformation. The maximum height can advantageously be compared to the reference or a reference value, which may determine the suitability for printing of the sheet. When the maximum sheet height, for example, exceeds the reference, the level at which the sheet was treated is deemed unsuited for printing, and is not taken into account when determining the suitable level.

In another embodiment, the step of comparing the data further comprises comparing the maximum sheet height for the at least one predetermined level of the at least one physical operating condition to a threshold value, preferably related to the print head gap spacing of the printing system. When the maximum sheet height of a sheet exceeds the print gap spacing in the image forming unit, there is risk of "head touch"; the sheet comes into contact with the print head, possibly damaging it. This risk is significant when duplex printing sheets. By determining the maximum sheet height, the method according to the present invention can advantageously reduce or even eliminate the risk of "head touch". When the maximum sheet height determined for a level of an operating condition equals or exceeds the print head gap spacing, said level is deemed unsuited for printing. In the comparison step, only levels corresponding to a maximum sheet height below the print head gap spacing are taken into account. Preferably, the suitable level is determined by selecting the level with a maximum sheet height closest to, but below, the print head gap spacing. In a further embodiment, the method according to the present invention further comprising the step of characterizing the at least one predetermined level of the least one physical operating condition as unsuited for printing when comparing the maximum sheet height for the at least one predetermined level of the at least one physical operating condition to a threshold value. Other threshold values may be applied for example for limiting the level of the operating condition to a desired range. For example, the humidity of a sheet may be limited to a certain range.

In an embodiment, the at least one operating condition of the printing system includes temperature and the at least predetermined level of the temperature lies within the range of about 50° C. to about 120° C.; and/or wherein the at least one physical operating condition of the printing system includes relative humidity, and wherein the one or more predetermined level of the relative humidity lies within the range of about 10% to about 90%; and/or wherein the at least one physical operating condition of the printing system includes ink coverage of a sheet, and wherein the at least one predetermined level of the ink coverage lies within the range of about 0 g/m$^2$ to about 20 g/m$^2$; and/or wherein the at least one physical operating condition of the printing system includes framing distance of a sheet, and wherein the at least one predetermined level of the framing distance lies within the range of about 0 mm to about 50 mm; and/or wherein the at least one physical operating condition of the printing system includes under-pressure and/or transport speed of a sheet transport system.

The temperature, humidity, ink coverage, framing distance, underpressure, and/or transport speed treatment may be applied to the sheet in the sheet input module or in the image forming unit. Preferably, the sheet is transported rapidly (e.g. within 5 to 15 seconds) to a sensing unit to determine an accurate representation of the deformations introduced in the sheet by said treatment. Alternatively, the sensing device may comprise similar operating conditions as image forming unit or sheet input module.

In a further embodiment, the method according to the present invention further comprises the step of adjusting the least one physical operating condition of the printing system to the suitable level of the least one physical operating condition. After determining the suitable level of an operating condition the printing system is set to said level. This can be done by a user via a user interface or via the processor device or controller which adjusts the parameters for the operating conditions of the printing system based on the determined suitable levels for the operating conditions. Preferably, a suitable level is determined for each relevant parameter of the printing system, but the operator can before select the relevant operating conditions, and the range over which the operator wishes to vary said operating conditions.

In even further embodiment, the step of treating the at least one sheet includes exposing the at least one sheet to the at least one physical operating condition of the printing system at a plurality of predetermined levels, wherein the plurality of predetermined levels are preferably substantially regularly spaced across a range. The levels of each operating condition are varied systematically, for example in evenly spaced steps across a range. The spacing of said steps can be adjusted based on the desired accuracy with which an operator wishes to determine the suitable level for an operating condition.

In another embodiment, the step of sensing the topology of the sheet includes holding and conveying the sheet on the transport path in a manner substantially identical to a manner of holding and conveying the sheet (S) in an image forming unit or printing head unit of the printing system; and/or wherein the step of sensing the topology of the sheet includes sensing substantially an entire surface of the sheet, preferably via an optical scanner such as a laser scanner, wherein the topology data preferably includes image data comprising pixels; and/or wherein the step of sensing the topology of the sheet takes place over a first surface of the sheet on a first pass or simplex pass of the transport path towards an image forming unit or a printing head unit of the printing system, and/or over a second surface of the sheet on a second pass or a duplex pass of the transport path towards the image forming unit or printing head unit of the printing system.

In a further embodiment, the invention provides a method of determining suitable operating conditions for printing sheets in a printing system and/or for optimizing the handling and/or printing of sheets in a printing system, comprising:

introducing a plurality of sheets to be printed into the printing system, and especially into a sheet input module of the printing system;

treating the sheets by exposing the sheets, either individually or collectively, to at least one operating condition or parameter of the printing system at one or more predetermined levels or magnitudes;

sensing a surface geometry or a topology of each sheet to be printed to generate data representative of that surface geometry or topology for each predetermined level or magnitude of the operating condition or parameter;

processing the surface geometry or topology data generated to identify and classify deformations in the surface geometry or topology of the sheet for each level or magnitude of the respective operating condition or parameter.

As discussed above, the step of processing the surface geometry or topology data is preferably performed according to at least one predetermined criterion and includes determining whether one or more deformations identified or detected in the sheet renders the sheet unsuitable for printing. The at least one predetermined criterion will typically include one or more of: height of a detected deformation out of a plane of the sheet, and area of a detected deformation in the plane of the sheet. Thus, determining the suitability of the sheet for printing typically comprises determining whether a deformation detected has a particular classification, e.g. a particular size and/or shape classification. In this way, the method may determine that a detected deformation exceeds a threshold size and thus renders the sheet unsuitable for printing.

Thus, in a preferred embodiment of the method, the step of processing the surface geometry or topology data includes determining whether a deformation identified exceeds a threshold size to render the sheet unsuitable for printing. Further, the processing step includes correlating the threshold size to the predetermined level or magnitude of the respective physical operating condition or parameter. This then enables the inventive method to be calibrated for one or more desired operating condition or parameter of the printing system in order to achieve an suitable or optimized handling and/or printing of the sheets.

As also discussed above, in a preferred embodiment the at least one operating condition or parameter of the printing system may be selected from the group consisting of: (i) temperature, with one or more predetermined level or magnitude of the temperature preferably lying within the range of about 50° C. to about 120° C.; (ii) relative humidity, with the one or more predetermined level or magnitude of the relative humidity preferably lying within the range of about 10% to about 90%; (iii) ink coverage of the sheet, with the one or more predetermined level or magnitude of the ink coverage preferably lying within the range of about 0 g/m$^2$ to about 20 g/m$^2$; (iv) framing distance of a sheet, with the one or more predetermined level or magnitude of the framing distance preferably lying within the range of about 0 mm to about 50 mm; (v) an under-pressure of a sheet transport system in the printing system; and (vi) a transport speed of a sheet transport system.

In a particularly preferred embodiment, the step of treating the sheets includes exposing the sheets, either individually or collectively, to the at least one physical operating condition or parameter at a plurality of predetermined magnitudes or levels, wherein the plurality of predetermined magnitudes or levels are preferably substantially regularly spaced across a range.

Furthermore, in a preferred embodiment the method includes controlling further progress of the sheet along the transport path of the printing system depending on the deformations identified and classified in the surface geometry or topology of the sheet. In this regard, controlling the further progress of the sheet along the transport path preferably includes controlling or effecting removal of the sheet from the transport path of the printing system if one or more deformations identified in the surface geometry or topology of the sheet would render the sheet unsuitable for printing. Thus, the method may include removing or ejecting a sheet from the transport path of the printing system if a deformation detected is determined to exceed the threshold size. With the present invention, the shape of each sheet is sensed or measured in real time and can be rejected according to preselected criteria, optionally depending on multiple factors, e.g. the defect height can be combined with defect area. As the method of the invention measures out-of-plane deformations, all relevant shape parameters can be used as rejection criteria. The sheets do not need to be deformed deliberately to test run-ability of the system.

All of the above-mentioned procedures in the inventive method can be used to select a desired height of a print gap provided by the print heads in the printing system, which is a printing setting. That print gap setting, together with the other print settings, may thus lead to a minimized risk of head-touches in simplex and/or duplex printing. The print gap can also be automatically adjusted using the sensing and processing steps (i.e. the sensor unit and processor device of the inventive apparatus, which measures the height of sheet defects). An algorithm may, for example, determine the print gap setting and improve or optimize runability of the sheets in the printing system, e.g. including waste (i.e. sheets rejected by the controller), print quality, and print-head touches to prevent print head damage.

In a preferred embodiment, the step of sensing the surface geometry or topology of the sheet includes holding and conveying the sheet on the transport path in a manner substantially identical to a manner of holding and conveying the sheet in an image forming unit or printing head unit of the printing system. In this way, it is possible to detect and to measure or classify deformations in the surface of the sheet that may be expected in the image forming unit or printing head unit of the printing system with reasonable accuracy. That is, the detection and measurement of sheet deformations is highly dependent on the transport conditions. Thus, by using simulated transport conditions, with the possibility to adapt one or more of the relevant parameters, the method of the invention allows accurate prediction or assessment of the sheet deformation at the image forming unit.

As also discussed above, the printing process may comprise a single-pass of the print medium sheets through an image forming unit or, alternatively, a multi-pass process for image formation. In a preferred embodiment, the step of sensing the surface geometry or topology of the sheet takes place on a first pass or simplex pass of the sheet on the transport path towards an image forming unit or a printing head unit of the printing system. In a multi-pass (e.g. duplex) printing process, the step of sensing the surface geometry or topology of the sheet preferably takes place on each pass of the transport path by a sheet of print medium towards the image forming device or printing head unit of the printing system. In this regard, the sensing step preferably includes sensing the surface geometry or topology of substantially an entire surface or side of the sheet. The method may be optionally be configured for sensing both sides of the sheet. The sensing operation may, for example, be performed by an optical sensor or scanner, such as a laser scanner. Thus, the surface geometry data or topology data will typically include image data comprising image elements or pixels.

In a preferred embodiment, the processing step comprises applying at least one algorithm to the surface area or topology data. The at least one algorithm may be configured to analyse pixels of the data row-by-row (or by row major) according to at least one criterion, such as height, to identify and classify deformations in the sheet. In this context, the algorithm preferably analyses neighbouring pixels of a pixel detected within a deformation.

In second aspect, the present invention provides an apparatus for determining suitable operating conditions for printing sheets in a printing system. The apparatus comprises
   a sheet input module for introducing at least one sheet into a printing system, wherein the printing system is arranged for exposing the at least sheet to at least one physical operating condition of the printing system at least one predetermined level;
   a sensing unit comprising at least one first sensor device for sensing a surface geometry of a surface of the at least one sheet and for generating data representing of the surface geometry of the surface of the at least one sheet for the at least one predetermined level of the at least one physical operating condition;
   a processor device for comparing the data representing a height map of the surface of the at least one exposed sheet for the at least one predetermined level of the at least one physical operating condition to a reference to determine the suitable operating conditions of the printing system, preferably or specifically a suitable level of the least one physical operating condition; and
   a controller device for selecting or adjusting the at least one physical operating condition of the printing system to the suitable operating conditions of the printing system, preferably to the suitable level of the least one physical operating condition.

The printing system may comprise transport path along which the sheet is transport through the printing system. The sensing unit is preferably positioned downstream along the transport path from the sheet input module, while the image forming unit is preferably positioned downstream of the sensing unit. From the image forming unit the sheet may transported to a sheet output module or back towards the input side of image forming unit or the sensing unit via a duplex pass of the transport path.

The treatment may be applied to the sheet in the sheet input module or the image forming unit. There, the sheet may be heated, humidified, or ink covered at a predetermined level.

After treatment, the sheet is transported to the sensing unit, which preferably measures a height map of the surface of the sheet and converts the height map into data. The height map data comprises information regarding the sheet and the level of the operating parameter applied to the sheet. For example, the data may comprise the height map, values for the level of the operating parameter, and sheet parameters, such as dimension and material.

The data is sent to the processor device, which is arranged to compare the data for the sheet exposed to the at least one level of the at least one operating condition to a reference, for example data of another sheet exposed to a different level or a threshold value. The processor device may first analyze each data for each level separately to detect and classify deformations in the sheet exposed to said level of the operating condition. The processor device, for example, determines the numbers, classes, properties, and/or distribution of deformation in the sheet for each level. Based on this comparison, the suitable level of the least one physical operating condition is determined.

The suitable level determined is transmitted to the controller for selecting or adjusting the respective condition of the printing system to the suitable level. The controller may be a user interface, wherein the operator inputs the suitable level by setting a parameter corresponding to the respective operating condition to a value corresponding to the suitable level for said operating parameter. Alternatively, the processor device is arranged for transmitting the suitable level information to the controller, either via wired or wireless connection. Thereby, suitable operating conditions may be effectively determined, reducing sheet consumption and the risk of "head touch".

In an embodiment, the apparatus according to the present invention further comprises a memory unit for storing the data representing a height map of the surface of the at least one exposed sheet for the at least one predetermined level of the at least one physical operating condition. Preferably, the processor device is arranged for accessing the memory unit for comparing the data representing a height map of the surface of the at least one exposed sheet for the at least one predetermined level of the at least one physical operating condition to data stored in memory unit.

The memory unit may be arranged for storing information related to the height map data for an exposed sheet along with information related to the level of the operating parameter to which the sheet was exposed. As such a data set is formed comprising height map information and operating condition information. The processor device may access the information in the memory unit for analysis. Stored data sets may be compared to one another, reference values, or generated data.

In an embodiment, the sheet input module and/or the image forming unit is arranged for treating the at least one sheet,
  wherein the at least one physical operating condition or parameter of the printing system includes temperature, wherein the one or more predetermined level or magnitude of the temperature lies within the range of about 50° C. to about 120° C.; and/or
  wherein the at least one physical operating condition or parameter of the printing system includes relative humidity, wherein the one or more predetermined level or magnitude of the relative humidity lies within the range of about 10% to about 90%; and/or
  wherein the at least one physical operating condition or parameter of the printing system includes ink coverage of a sheet, wherein the one or more predetermined level or magnitude of the ink coverage lies within the range of about 0 $g/m^2$ to about 20 $g/m^2$; and/or
  wherein the at least one physical operating condition or parameter of the printing system includes edge framing distance of a sheet, wherein the one or more predetermined level or magnitude of the framing distance lies within the range of about 0 mm to about 50 mm; and/or
  wherein the at least one physical operating condition or parameter of the printing system includes under-pressure and/or transport speed of a sheet transport system.

The sheet input module and/or the image forming may comprise a heating unit for adjusting the temperature the sheet is exposed to, a temperature sensor, and/or a temperature controller for adjusting the temperature the sheet is exposed to the desired level. The sheet input module and/or the image forming may comprise a humidifier unit for adjusting the humidity the sheet is exposed to, a humidity sensor, and/or a humidity controller for adjusting the humidity the sheet is exposed to the desired level. Preferably, the image forming unit comprises an ink coverage controller for adjusting the ink coverage deposited on a sheet. The printing system may further comprise a controller for adjusting the transport speed and/or the under-pressure acting on the sheet. Said controller controls the transport mechanism. In an embodiment, the above operation conditions can be controlled via a controller connected to the processor device. The processor device is able to link the levels of operating conditions a sheet is exposed to the height map data generated when sensing the sheet, which was exposed to said levels of operation conditions. By comparison the suitable level is determined and that information is sent from the processor device to the controller. Each data set generated in this manner contains a complete description of the operating conditions, as well as the height map related data.

In an embodiment, the sensing unit is further arranged for:
  determining the maximum sheet height of the at least one sheet for the at least one predetermined level of the at least one physical operating condition; and
  comparing the maximum sheet height for the at least one predetermined level of the at least one physical operating condition to at least one threshold value stored on the memory unit.

In a further embodiment, the apparatus according to the present invention, further comprises an image forming unit comprising a print head with a print head gap spacing, wherein the at least one threshold is related to the print head gap spacing. The sensing unit is arranged for the suitable level of the at least one physical operating condition by comparing the comparing the maximum sheet height for the at least one predetermined level of the at least one physical operating condition to the at least one threshold value. The suitable level may be selected by selecting the level of the operating condition with resulted in a determined maximum sheet height closest to and below the print head gap spacing. This has the advantage of allowing for highest level of e.g. ink coverage without the risk of head touch.

In an embodiment, the present invention provides an apparatus for determining suitable operating conditions for printing sheets in a printing system, and/or for optimizing handling and/or printing of sheets in a printing system, comprising:
  a sheet input module for introducing a plurality of sheets to be printed into a printing system, wherein the sheets are exposed, either individually or collectively, to at least one operating condition or parameter of the printing system at one or more predetermined level or magnitude;
  a sensing unit comprising at least one first sensor device for sensing a surface geometry or topology of each sheet to be printed and generating data representative of that surface geometry or topology for each predetermined level or magnitude of the operating condition or parameter; and a processor device for processing the data from the first sensor device to detect and classify deformations in the surface geometry or topology of each sheet for each level or magnitude of the operating condition or parameter.

In this way, the invention provides an apparatus or device for sheet deformation measurement which is capable of sensing and measuring the surface shape of the sheet. By analysing the surface shape data of the sheet, relevant deformations or defects in the sheet and their properties can be detected or identified or extracted from the data. Furthermore, a classification can be made for each deformation or defect found within the sheet; for example, a type or shape classification (e.g. a "dog ear", curl, or waviness) and/or a size classification can be made. The data from the detection and classification of the deformations may then be used to assess or determine the suitability of the sheet for printing, to find a root cause or root defect in the printing system and/or to monitor printing system performance. Because the impact of a deformation or defect in a sheet on the printing system may vary depending on a number of different operating parameters or conditions in the system, the present invention is configured to employ at least one, and preferably a plurality, of different operating parameters or conditions selected at one or more predetermined level or magnitude for assessing the impact on the suitability of the sheets for printing and calibrating threshold values for the type and/or size classification of deformations or defects detected in the sheets. The processor device will typically include a data storage unit for storing the data from the at least one first sensor device as well as the predetermined criteria.

In a preferred embodiment of the invention, therefore, the processor device is configured to ascertain or determine whether a deformation detected in the surface geometry or topology of the sheet exceeds a threshold size or extent to render the sheet unsuitable for printing. In doing so, the processor device is also configured to correlate the threshold size or extent of the deformation to each predetermined level or magnitude of the at least one physical operating condition or parameter. In this way, the apparatus of the invention is able to be calibrated to prevailing or desired operating conditions or parameters of the printing system for achieving a suitable or optimized handling and/or printing of the sheets. In particular, the sheets with deformations or defects expected to cause a "head-touch" at the print heads of the printing system under those operating conditions or parameters can be detected and classified as such before they cause a degradation of the print quality or a sheet jam in the system.

In a preferred embodiment, one operating condition or parameter of the printing system includes temperature and the one or more predetermined level or magnitude of the temperature preferably lies within the range of about 50° C. to about 120° C. The sheets to be printed may therefore be exposed to and heated to one or more such temperature to calibrate the apparatus and the printing system for determining a threshold for a maximum allowable deformation of the sheets at a given temperature, which would still be suitable for printing.

In a preferred embodiment, another operating condition or parameter of the printing system includes relative humidity, and the one or more predetermined level or magnitude of the relative humidity preferably lies within the range of about 10% to about 90%. The sheets to be printed may therefore be exposed to and influenced by one or more such relative humidity to calibrate the apparatus and the printing system for determining a threshold for a maximum allowable deformation (e.g. waviness) of the sheets at a given relative humidity that would still be suitable for printing.

In a preferred embodiment, a further operating condition or parameter of the printing system includes ink coverage of a sheet to be printed. The one or more predetermined level or magnitude of the ink coverage preferably lies within the range of about 0 g/m$^2$ to about 20 g/m$^2$. The sheets to be printed may thus be exposed to and treated with such an ink coverage to calibrate the apparatus and printing system for determining a threshold for a maximum allowable deformation of the sheets at a ink coverage, which would still be suitable for printing.

In a preferred embodiment, yet another operating condition or parameter of the printing system includes an edge framing distance of a sheet, and the one or more predetermined level or magnitude of the edge framing distance preferably lies within the range of about 0 mm to about 50 mm, and more preferably within the range of about 5 mm to about 20 mm.

In a preferred embodiment, yet a further operating condition or parameter of the printing system includes an under-pressure and/or transport speed of a sheet transport system in the printing system.

In a particularly preferred embodiment of the invention, the sheet input module is configured to expose the sheets, either individually or collectively, to the at least one operating condition or parameter of the printing system at a plurality of pre-set or predetermined levels or magnitudes. In this regard, the predetermined levels or magnitudes are preferably spaced substantially regularly across a range of those levels or magnitudes. For example, where the operating condition or parameter is temperature, the sheets to be printed may be exposed to and heated to a plurality of different temperatures spaced with a preselected range, such as the range of about 50° C. to about 120° C. Where the operating condition or parameter is relative humidity, on the other hand, the sheets may be exposed to and humidified at a plurality of different relative humidities with a preselected range, such as the range of about 10% to about 90% relative humidity. Where the operating condition or parameter is ink coverage, the sheets may be exposed to and treated with a plurality of different the ink coverages spaced with a preselected range, such as the range of about 0 g/m$^2$ to about 20 g/m$^2$.

In a preferred embodiment of the invention, the processor device is configured to detect and classify deformations in the surface geometry or topology of the sheet based on at least one predetermined criterion to determine whether a deformation renders the sheet unsuitable for printing; e.g. because a detected deformation exceeds a threshold size or extent. Thus, the at least one predetermined criterion preferably includes one or more of: a height of a deformation out of a plane of the sheet, and an area of a deformation in the plane of the sheet. In the event that the sheets have a defect, such as a curl, waviness or a dog-ear, these sheets increase the risks of a sheet jam, damage to the image forming unit or printing head, defects in the printed image, and so on. Therefore, the apparatus is designed to avoid such potential risks to increase the printing system productivity, lifetime, and print quality. Sheet deformation can often arise when loading the sheet into the printing system. By applying the at least one predetermined criterion for assessing the sheets on a first or single pass of the transport path, it is possible to supply only non-damaged or non-defective sheets to image forming unit, so that the above-mentioned risks can be minimized.

In a preferred embodiment, the apparatus includes a controller which controls further progress of the sheet on the transport path of the printing system depending upon the deformations in the surface geometry or topology of the sheet detected by the processor. The controller is configured to control and/or to operate a removal device for removing the sheet from the transport path of the printing system if and when the processor device identifies one or more deformations in the surface geometry or topology of the sheet that render the sheet unsuitable for printing. In this way, the invention is configured to prevent the printing system from being stopped or negatively impacted by a defective print medium sheet. When a sheet deformation or defect is found, the sheet can be removed from the transport path, e.g. via a removal device or ejector device that may switch or re-route the defective sheet to a reject tray. Such a removal device or ejector device operated by the controller is preferably part of the apparatus of the invention. Depending on the result of sheet form sensing, therefore, every sheet is assessed or analysed according to the at least one predetermined criterion (i.e. as a removal or ejection criterion) as to whether the sheet should be removed or ejected from the transport path. The removal or ejection criterion is typically defined in terms of a maximum or threshold height out of the plane of the sheet. If the sheet has a larger defect than a given threshold value, the sheet will be removed or ejected.

In other words, to prevent the printing system from experiencing a loss of print quality, or a nozzle failure or a sheet jam, the controller can operate to prevent a sheet in which one or more deformations or defects are detected from progressing to an image forming device or printing head unit of the system. Especially humidity problems and wear of the system will show a gradual defect build up. Preventive measures can be taken to maintain system performance. As the apparatus of the invention employs data representative of the surface geometry or topology of the sheet (e.g. three-dimensional data), the invention is capable of detecting multiple deformation types. Thus, any relevant deformation present within the sheet can be detected using a full sheet topology measurement, e.g. a 3D image of the sheet surface. On the other hand, if the apparatus determines a sheet to be free of deformations or defects or to have only tolerable deformations or defects, it is allowed to progress to the image forming unit.

The printing system may be designed for a single-pass of the print medium sheets through an image forming device or for multi-pass image formation. In a preferred embodiment, the sensor device of the apparatus is configured and arranged to sense the surface geometry or topology of the sheet when the sheet is on a first pass or simplex pass of the transport path towards an image forming device or a printing head unit of the printing system. In the event the printing system employs multi-pass image formation, the sensor device of the apparatus may be configured and arranged to sense the surface geometry or topology of the sheet each time the sheet makes a pass of the transport path towards the image forming device or printing head unit of the printing system. For example, in a duplex-pass printing system, the sensor device is configured and arranged to sense a surface geometry or topology of the sheet both on the first pass or simplex pass as well as on the second pass or duplex pass.

With the present invention, therefore, a desired height of a print gap of the print heads in the printing system (which is a printing setting) can be selected or set to minimize a risk of head-touches for one or more specific operating conditions or parameters of the printing system, e.g. in simplex and/or duplex printing. The print gap can also be automatically adjusted using the sensor unit and the processor device of the inventive apparatus. By determining the suitable operating conditions or by optimizing the sheet runability in the printing system for specific operating conditions or parameters, waste can be prevented by only discarding those sheets which would be unsuitable for printing under current operating conditions or parameters. In addition to waste prevention, an operator of the printing system may achieve a maximum print quality (i.e. output quality) for a specific print medium. The operator is thereby able to improve or optimize cost and quality, and thus profitability of the printing system. Settings could even be dependent not only on print medium, but also on a particular batch of sheets of that print medium.

The moment in time at which a sheet deformation or defect appears within the printing process and the shape and/or the size of the deformation or defect can help to determine the cause of that defect. For example, if a pack of paper print medium sheets is dropped before being fed into a printing system, the associated defects in the paper will appear directly at a simplex pass proofing. In such a case, where a sheet is identified as having a dog-eared corner, it is highly probable that many subsequent sheets will also have a dog ear at one of the corners of the sheet. It will be appreciated, however, that the sheets to be printed can also be damaged or acquire one or more defects during the printing process on a simplex pass through the system. For example, sheets can develop very specific waviness deformations due to humidity variation that can readily be distinguished from dog ears and curl defects. On the other hand, if the duplex sheet transport mechanism in the printing system is defective, the sheets may become damaged during the duplex pass. In such a case, the presence of a defect in the duplex pass may be confirmed by the simplex pass sheet analysis showing that the sheet was not damaged at that time. For this reason, sheet form sensing on the duplex pass also helps to decrease the above-mentioned risks of sheet jam, damage to the image forming unit or printing head, defects in the printed image, and so on. Significantly, however, the impact of removing or rejecting a sheet on the duplex pass can be higher than removing or rejecting a sheet on the simplex pass. Because sheet removal on the duplex pass results in a missing page in the output, duplex sheets following a removed or rejected sheet also need to be removed to ensure that the printed images are in a correct order in the final output stock. Due to this fact, the impact of sheet removal on productivity is multiplied in the duplex pass. If a user prefers higher productivity, sheets should be removed or rejected as little as possible on the duplex pass, to the extent that this does not cause serious problems. Such different requirements or criteria for removal or ejection between the simplex and the duplex passes of the transport path may, for example, be satisfied by setting a larger threshold value for a removal or ejection criterion in the duplex pass than in the simplex pass.

As it is desired to prevent defective sheets from reaching the printing heads of an image forming unit in the printing system, the removal device is typically arranged to remove the sheet from the transport path upstream of the image forming unit or printing head unit of the system. To this end, the sensing unit should be spaced a sufficient distance from the image forming unit; i.e. space is required to remove a sheet containing deformations from the transport path. The sensing unit may therefore be provided as a "sentry unit" for location in the transport path of the printing system before (i.e. upstream of) the image forming unit to allow the removal device or ejector device to be positioned between the sentry unit and the image forming unit. The minimum distance along the transport path between the sentry unit and the image forming unit may be determined by a sheet length and the processing time needed to detect and classify deformations. For example, a long sheet could have a defect on the trailing edge. The processor device will require time to process the data generated by the first sensor device and detect a deformation at the trailing edge after this has passed the measurement position. Thus, a leading edge of the sheet should not have passed the removal device at the moment of sensing the trailing edge of the sheet in order to ensure that a removal of the sheet upstream of the image forming unit is still possible. In this regard, a sheet transport mechanism for transporting or conveying the sheets to be printed between the sentry unit and the image forming unit may be different to a transport mechanism employed by each of the sensing unit and the image forming unit. Specifically, this sheet transport mechanism in between may be optimized for a reliable sheet removal or ejection.

In a preferred embodiment of the invention, the sensing unit includes a conveyor mechanism which is configured to hold and transport the sheet on the transport path in a manner substantially identical to a transport mechanism in an image forming unit or printing head unit of the printing system. In particular, to be able to obtain an accurate measurement at the sensing unit, the sheet surface should be transported under substantially identical conditions as when it is transported at the image forming unit. The sheet transport mechanism within the sensing unit thus simulates transport conditions used within the image forming unit. This way, the deformations measured within the sensing unit can be used to accurately predict the deformations that will be present within the sheet at the image forming unit. Simulated transport conditions can be obtained by using a functionally identical suction belt conveyor within the sensing unit if the image forming unit also uses a suction belt conveyor as sheet transport mechanism. To create the same vacuum hold down force it is not only important that the vacuum force (or under-pressure) is substantially identical for both belt conveyors, but also the suction hole diameter and pattern, the geometry of the vacuum forming channels within the belt support structure, etc. The same applies for other sheet conveyor means; e.g. with one or more gripper members within the sensing unit if the image forming unit also has one or more gripper members. In addition, means may be provided for adjusting relevant sheet transport condition parameters in the conveyor mechanism of the sensing unit for greater accuracy in simulating sheet transport conditions at the image forming unit.

In a particularly preferred embodiment, the sheet to be printed is a sheet of a print medium selected from the group comprised of: paper, polymer film, such as polyethylene (PE) film, polypropylene (PP) film, polyethylene terephthalate (PET) film, metallic foil, or a combination of two or more thereof.

In a preferred embodiment of the invention, the processor device is configured to detect and classify deformations in the surface geometry or topology of the sheet to determine whether a deformation identified exceeds a threshold size to thereby render the sheet unsuitable for printing. Alternatively, or in addition, the processor device is configured to detect and classify deformations in the surface of the sheet for statistical purposes to determine print media reliability. In this regard, the data is analysed by the processor device to determine any one or more of: a number of deformations present within a sheet, a height of each deformation, and area of each deformation. In this way, the apparatus of the invention is employed to create test methods for determining the runability of print media, determining suitable operating conditions for printing sheets in a printing system and/or for optimizing the operating parameters depending on the print medium used; e.g. the maximum ink coverage that can be used on a certain print medium.

In a preferred embodiment, the sensor device is configured and arranged to sense the surface geometry or topology of the sheet when the sheet is on a transport path of the printing system. As noted above, the apparatus may include an ejector device for removing the sheet from the transport path of the printing system if the processor device determines that the sheet is unsuitable for printing. In this case, a sheet may be determined as unsuitable for printing if, for example, a deformation detected has a particular shape classification (e.g. a "dog ear", curl, or waviness) and/or a particular size classification (e.g. if the deformation detected exceeds a threshold size, such as a maximum allowable height and/or a maximum allowable area). The controller is configured to control the ejector device to remove the sheet from the transport path depending on the processing of the surface geometry or topology data by the processor. The apparatus for measuring sheet deformation is thus used for rejecting sheets from the paper path to enhance printing reliability.

In a particularly preferred embodiment, the apparatus further comprises at least one second sensor device located downstream of the first sensor device, and typically upstream of and/or in an image forming unit or printing head unit of the printing system, for sensing a surface geometry or a topology of a sheet to provide feedback data or correlation data to the processor device for comparison with the data from the at least one first sensor device. As will be appreciated, the sheet transport conditions can never be reproduced with one-hundred percent accuracy at the sensing unit and this limits the accuracy of the sheet deformation analysis or measurement by the apparatus. By adding a second sheet shape measurement or sensor device at the image forming unit, the accuracy can be tested and improved by using feedback. The second sensor device or measuring device at the image forming unit does not necessarily have to be identical to the first sensor device. A more limited system, e.g. a single point measurement device, could be used to provide feedback for a two-dimensional (2D) profile measuring device.

In a preferred embodiment, either or both of the first and second sensor devices is configured to sense substantially an entire surface or side of the sheet, preferably via an optical sensor, such as a laser scanner. In any case, the surface geometry or topology data typically includes image data comprising pixels. The processor device is preferably configured to detect and classify deformations in the surface geometry or topology of the sheet according to at least one of a plurality of criteria including: height (e.g. in mm), area (e.g. in pixels), bounding area (e.g. in pixels), and/or centre of gravity in the surface geometry or topology data processed. To this end, the processor device typically employs at least one algorithm for processing or analysing the surface area or topology data from the sensor device. In particular, a reliable deformation or defect classification which is independent of the defect size and shape can be accomplished by a recognition algorithm using defect property parameters that are independent of the type of deformation. These preferably include: a bounding box (e.g. in the form of a rectangular box drawn around and entirely encompassing the deformation in the data), an area of the defect or deformation, centre of gravity, and maximum height and position of the defect or deformation.

In a particularly preferred embodiment, the at least one algorithm is configured to analyse an array of pixels in the surface geometry or topology data (image data) row-by-row according to at least one criterion, such as height, to identify and to classify a deformation in the sheet. Further, the algorithm may be configured to analyse neighbouring pixels of a pixel within a deformation.

A classification algorithm for classifying a detected defect or deformation in the present invention typically uses simple-to-calculate properties like a bounding box (e.g. a rectangular box drawn around and encompassing the deformation), an area of the deformation, a centre of gravity of the defect or deformation, and maximum height and position of the defect or deformation. These properties are generally easy to calculate in real time. The dog-ear type of defect or deformation has a unique property that the maximum height is located at the corner of the bounding box, which is located at the corner of the sheet. The maximum height of a wave type of defect or deformation is located in the middle of one of the vertices of the bounding box, which in turn is located at one of the edges of the sheet. It will be appreciated that other algorithms, e.g. employing correlation techniques, can also be used but these may be much more computation intensive and sensitive to the actual defect shape and size.

According to a further aspect, the present invention provides a printing system comprising a defect detection apparatus according to any one of the embodiments described above for performing a method of detecting defects according to any one of the embodiments described above.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which:

FIG. 4 is a schematic side view of a printing system with a defect detection system according to an embodiment of the invention;

FIG. 5 is a schematic side view showing more detail of a printing system with a defect detection system in the duplex transport path according to an embodiment of the invention;

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION OF EMBODIMENTS

Figure 1:
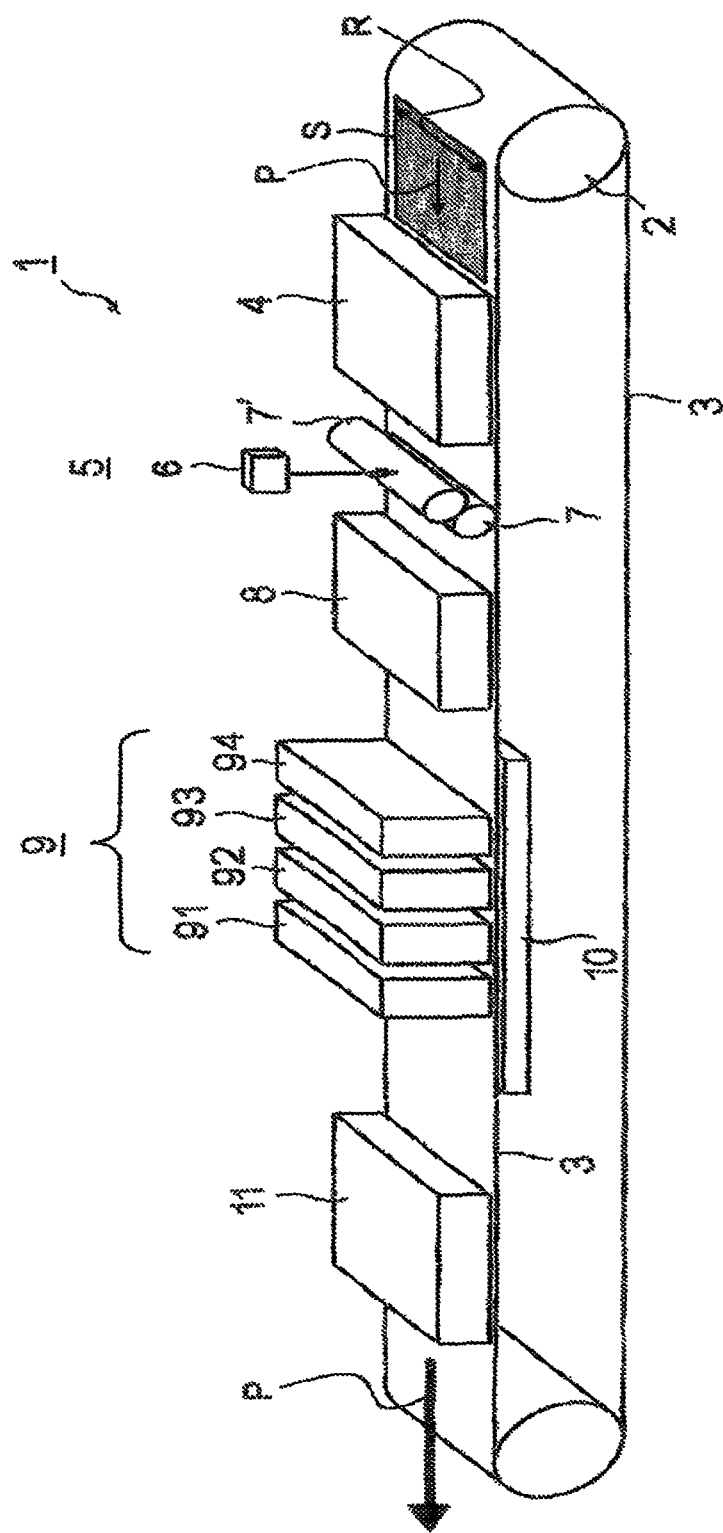
FIG. 1 is a schematic side view of part of a printing system according to an embodiment of the invention.

With reference to FIG. 1 of the drawings, a portion of an inkjet printing system 1 according to a preferred embodiment of the invention is shown. FIG. 1 illustrates in particular the following parts or steps of the printing process in the inkjet printing system 1: media pre-treatment, image formation, drying and fixing and optionally post treatment. Each of these will be discussed briefly below.

FIG. 1 shows that a sheet S of a receiving medium or print medium, in particular a machine-coated print medium, is transported or conveyed along a transport path P of the system 1 with the aid of transport mechanism 2 in a direction indicated by arrows P. The transport mechanism 2 may comprise a driven belt system having one or more endless belt 3. Alternatively, the belt(s) 3 may be exchanged for one or more drums. The transport mechanism 2 may be suitably configured depending on the requirements of the sheet transport in each step of the printing process (e.g. sheet registration accuracy) and may hence comprise multiple driven belts 3, 3' and/or multiple drums. For a proper conveyance of the sheets S of the receiving medium or print medium, the sheets S should be releasably fixed to and/or held by the transport mechanism 2. The manner of such fixation or holding is not limited and may, for example, be selected from the group of: mechanical fixation (e.g. clamping), electrostatic fixation, and vacuum fixation, of which vacuum fixation is particularly preferred.

Media Pre-treatment

To improve spreading and pinning (i.e. fixation of pigments and water-dispersed polymer particles) of the ink on the print medium, in particular on slow absorbing media, such as machine-coated media, the print medium may be pre-treated, i.e. treated prior to the printing of an image on the medium. The pre-treatment step may comprise one or more of the following:

(i) pre-heating of the print medium to enhance spreading of the ink used on the print medium and/or to enhance absorption into the print medium of the ink used;

(ii) primer pre-treatment for increasing the surface tension of print medium in order to improve the wettability of the print medium by the ink used and to control the stability of the dispersed solid fraction of the ink composition, i.e. pigments and dispersed polymer particles; (N.B. primer pre-treatment can be performed in a gas phase, e.g. with gaseous acids such as hydrochloric acid, sulphuric acid, acetic acid, phosphoric acid and lactic acid, or in a liquid phase by coating the print medium with a pre-treatment liquid. A pre-treatment liquid may include water as a solvent, one or more co-solvents, additives such as surfactants, and at least one compound selected from a polyvalent metal salt, an acid and a cationic resin); and (iii) corona or plasma treatment.

FIG. 1 illustrates that the sheet S of print medium may be conveyed to and passed through a first pre-treatment module 4, which module may comprise a preheater, (e.g. a radiation heater), a corona/plasma treatment unit, a gaseous acid treatment unit or a combination of any of these. Subsequently, a predetermined quantity of the pre-treatment liquid may optionally be applied on a surface of the print medium via a pre-treatment liquid applying device 5. Specifically, the pre-treatment liquid is provided from a storage tank 6 to the pre-treatment liquid applying device 5, which comprises double rollers 7, 7'. A surface of the double rollers 7, 7' may be covered with a porous material, such as sponge. After providing the pre-treatment liquid to auxiliary roller 7' first, the pre-treatment liquid is transferred to main roller 7, and a predetermined quantity is applied onto the surface of the print medium. Thereafter, the coated printing medium (e.g. paper) onto which the pre-treatment liquid was applied may optionally be heated and dried by a dryer device 8, which comprises a dryer heater installed at a position downstream of the pre-treatment liquid applying device 5 in order to reduce the quantity of water content in the pre-treatment liquid to a predetermined range. It is preferable to decrease the water content in an amount of 1.0 weight % to 30 weight % based on the total water content in the pre-treatment liquid provided on the print medium sheet S. To prevent the transport mechanism 2 from being contaminated with pre-treatment liquid, a cleaning unit (not shown) may be installed and/or the transport mechanism 2 may include a plurality of belts or drums 3, 3', as noted above. The latter measure avoids or prevents contamination of other parts of the printing system 1, particularly of the transport mechanism 2 in the printing region.

It will be appreciated that any conventionally known methods can be used to apply the pre-treatment liquid. Specific examples of an application technique include: roller coating (as shown), ink-jet application, curtain coating and spray coating. There is no specific restriction in the number of times the pre-treatment liquid may be applied. It may be applied just one time, or it may be applied two times or more. An application twice or more may be preferable, as cockling of the coated print medium can be prevented and the film formed by the surface pre-treatment liquid will produce a uniform dry surface with no wrinkles after application twice or more. A coating device 5 that employs one or more rollers 7, 7' is desirable because this technique does not need to take ejection properties into consideration and it can apply the pre-treatment liquid homogeneously to a print medium. In addition, the amount of the pre-treatment liquid applied with a roller or with other means can be suitably adjusted by controlling one or more of: the physical properties of the pre-treatment liquid, the contact pressure of the roller, and the rotational speed of the roller in the coating device. An application area of the pre-treatment liquid may be only that portion of the sheet S to be printed, or an entire surface of a print portion and/or a non-print portion. However, when the pre-treatment liquid is applied only to a print portion, unevenness may occur between the application area and a non-application area caused by swelling of cellulose contained in coated printing paper with water from the pre-treatment liquid followed by drying. From a view-point of uniform drying, it is thus preferable to apply a pre-treatment liquid to the entire surface of a coated printing paper, and roller coating can be preferably used as a coating method to the whole surface. The pre-treatment liquid may be an aqueous liquid.

Corona or plasma treatment may be used as a pre-treatment step by exposing a sheet of a print medium to corona discharge or plasma treatment. In particular, when used on media such as polyethylene (PE) films, polypropylene (PP) films, polyethylene terephthalate (PET) films and machine coated media, the adhesion and spreading of the ink can be improved by increasing the surface energy of the medium. With machine-coated media, the absorption of water can be promoted which may induce faster fixation of the image and less puddling on the print medium. Surface properties of the print medium may be tuned by using different gases or gas mixtures as medium in the corona or plasma treatment. Examples of such gases include: air, oxygen, nitrogen, carbon dioxide, methane, fluorine gas, argon, neon, and mixtures thereof. Corona treatment in air is most preferred.

Image Formation

When employing an inkjet printer loaded with inkjet inks, the image formation is typically performed in a manner whereby ink droplets are ejected from inkjet heads onto a print medium based on digital signals. Although both single-pass inkjet printing and multi-pass (i.e. scanning) inkjet printing may be used for image formation, single-pass inkjet printing is preferable as it is effective to perform high-speed printing. Single-pass inkjet printing is an inkjet printing method with which ink droplets are deposited onto the print medium to form all pixels of the image in a single passage of the print medium through the image forming device, i.e. beneath an inkjet marking module.

Referring to FIG. 1, after pre-treatment, the sheet S of print medium is conveyed on the transport belt 3 to an image forming device or inkjet marking module 9, where image formation is carried out by ejecting ink from inkjet marking device 91, 92, 93, 94 arranged so that a whole width of the sheet S is covered. That is, the image forming device 9 comprises an inkjet marking module having four inkjet marking devices 91, 92, 93, 94, each being configured and arranged to eject an ink of a different colour (e.g. Cyan, Magenta, Yellow and Black). Such an inkjet marking device 91, 92, 93, 94 for use in single-pass inkjet printing typically has a length corresponding to at least a width of a desired printing range R (i.e. indicated by the double-headed arrow on sheet S), with the printing range R being perpendicular to the media transport direction along the transport path P.

Figure 2:
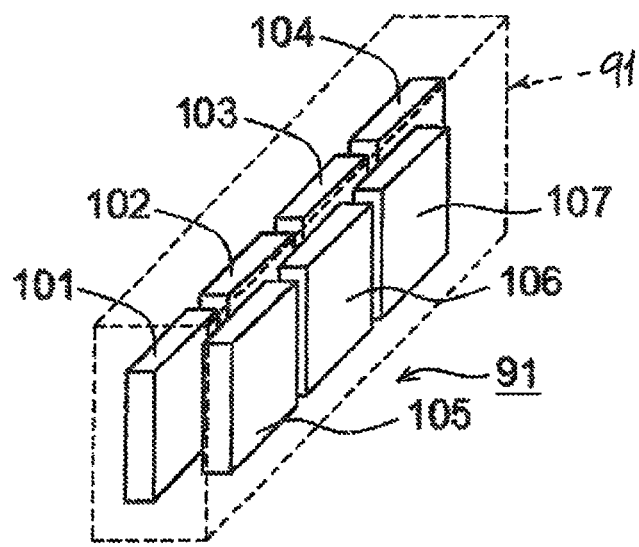
FIG. 2 is a schematic perspective view of an image forming device in the printing system of FIG. 1.
Figure 3A:
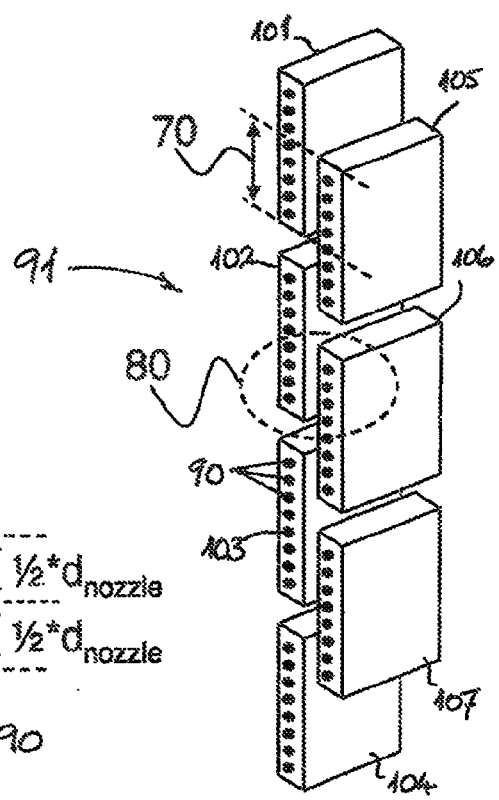
FIG. 3A is a schematic perspective underside view of printing heads in the image forming device of FIG. 2.
Figure 3B:
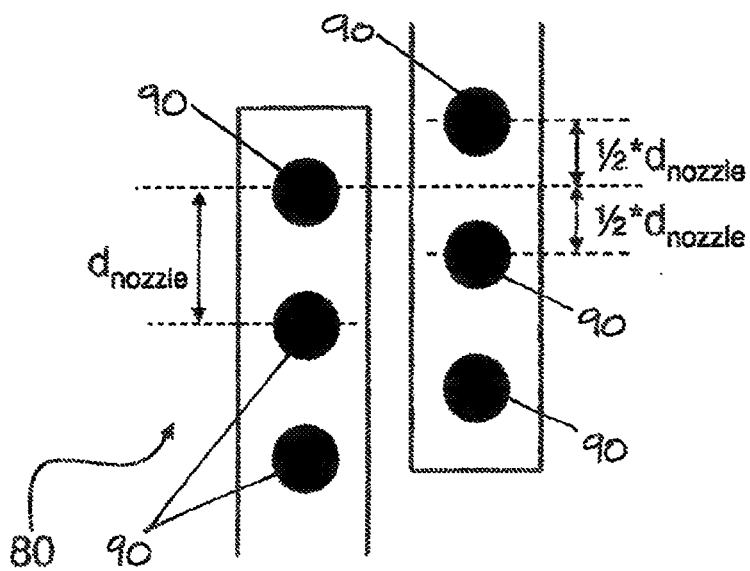
FIG. 3B is a detailed view of the printing heads in the image forming device of FIG. 2 and FIG. 3A.

Each inkjet marking device 91, 92, 93, 94 may have a single print head having a length corresponding to the desired printing range R. Alternatively, as shown in FIG. 2, the inkjet marking device 91 may be constructed by combining two or more inkjet heads or printing heads 101-107, such that a combined length of individual inkjet heads covers the entire width of the printing range R. Such a construction of the inkjet marking device 91 is termed a page wide array (PWA) of print heads. As shown in FIG. 2, the inkjet marking device 91 (and the others 92, 93, 94 may be identical) comprises seven individual inkjet heads 101-107 arranged in two parallel rows, with a first row having four inkjet heads 101-104 and a second row having three inkjet heads 105-107 arranged in a staggered configuration with respect to the inkjet heads 101-104 of the first row. The staggered arrangement provides a page-wide array of inkjet nozzles 90, which nozzles are substantially equidistant in the length direction of the inkjet marking device 91. The staggered configuration may also provide a redundancy of nozzles in an area O where the inkjet heads of the first row and the second row overlap. (See in FIG. 3A). The staggering of the nozzles 90 may further be used to decrease an effective nozzle pitch d (and hence to increase print resolution) in the length direction of the inkjet marking device 91. In particular, the inkjet heads are arranged such that positions of the nozzles 90 of the inkjet heads 105-107 in the second row are shifted in the length direction of the inkjet marking device 91 by half the nozzle pitch d, the nozzle pitch d being the distance between adjacent nozzles 90 in an inkjet head 101-107. (See FIG. 3B, which shows a detailed view of 80 in FIG. 3A). The nozzle pitch d of each head is, for example, about 360 dpi, where "dpi" indicates a number of dots per 2.54 cm (i.e. dots per inch). The resolution may be further increased by using more rows of inkjet heads, each of which are arranged such that the positions of the nozzles of each row are shifted in the length direction with respect to the positions of the nozzles of all other rows.

In the process of image formation by ejecting ink, an inkjet head or a printing head employed may be an on-demand type or a continuous type inkjet head. As an ink ejection system, an electrical-mechanical conversion system (e.g. a single-cavity type, a double-cavity type, a bender type, a piston type, a shear mode type, or a shared wall type) or an electrical-thermal conversion system (e.g. a thermal inkjet type, or a Bubble Jet® type) may be employed. Among them, it is preferable to use a piezo type inkjet recording head which has nozzles of a diameter of 30 μm or less in the current image forming method.

The image formation via the inkjet marking module 9 may optionally be carried out while the sheet S of print medium is temperature controlled. For this purpose, a temperature control device 10 may be arranged to control the temperature of the surface of the transport mechanism 2 (e.g. belt or drum 3) below the inkjet marking module 9. The temperature control device 10 may be used to control the surface temperature of the sheet S within a predetermined range, for example in the range of 30° C. to 60° C. The temperature control device 10 may comprise one or more heaters, e.g. radiation heaters, and/or a cooling means, for example a cold blast, in order to control and maintain the surface temperature of the print medium within the desired range. During and/or after printing, the print medium is conveyed or transported downstream through the inkjet marking module 9.

Drying and Fixing

After an image has been formed on the print medium, the printed ink must be dried and the image must be fixed on the print medium. Drying comprises evaporation of solvents, and particularly those solvents that have poor absorption characteristics with respect to the selected print medium.

FIG. 1 of the drawings schematically shows a drying and fixing unit 11, which may comprise one or more heater, for example a radiation heater. After an image has been formed on the print medium sheet S, the sheet S is conveyed to and passed through the drying and fixing unit 11. The ink on the sheet S is heated such that any solvent present in the printed image (e.g. to a large extent water) evaporates. The speed of evaporation, and hence the speed of drying, may be enhanced by increasing the air refresh rate in the drying and fixing unit 11. Simultaneously, film formation of the ink occurs, because the prints are heated to a temperature above the minimum film formation temperature (MFT). The residence time of the sheet S in the drying and fixing unit 11 and the temperature at which the drying and fixing unit 11 operates are selected or optimized, such that when the sheet S leaves the drying and fixing unit 11 a dry and robust image has been obtained. As described above, the transport mechanism 2 in the fixing and drying unit 11 may be separate from the transport mechanism 2 of the pre-treatment and printing parts or sections of the printing system 1 and may comprise a belt or a drum.

Post Treatment

To improve or enhance the robustness of a printed image or other properties, such as gloss level, the sheet S may be post treated, which is an optional step in the printing process. For example, in a preferred embodiment, the printed sheets S may be post-treated by laminating the print image. That is, the post-treatment may include a step of applying (e.g. by jetting) a post-treatment liquid onto a surface of the coating layer, onto which the ink has been applied, so as to form a transparent protective layer over the printed recording medium. In the post-treatment step, the post-treatment liquid may be applied over the entire surface of an image on the print medium or it may be applied only to specific portions of the surface of an image. The method of applying the post-treatment liquid is not particularly limited, and may be selected from various methods depending on the type of the post-treatment liquid. However, the same method as used in coating the pre-treatment liquid or an inkjet printing method is preferable. Of these, an inkjet printing method is particularly preferable in view of: (i) avoiding contact between the printed image and the post-treatment liquid applicator; (ii) the construction of an inkjet recording apparatus used; and (iii) the storage stability of the post-treatment liquid. In the post-treatment step, a post-treatment liquid containing a transparent resin may be applied on the surface of a formed image so that a dry adhesion amount of the post-treatment liquid is 0.5 $g/m^2$ to 10 $g/m^2$, preferably 2 $g/m^2$ to 8 $g/m^2$, thereby to form a protective layer on the recording medium. If the dry adhesion amount is less than 0.5 $g/m^2$, little or no improvement in image quality (image density, colour saturation, glossiness and fixability) may be obtained. If the dry adhesion amount is greater than 10 $g/m^2$, on the other hand, this can be disadvantageous from the view-point of cost efficiency, because the dryness of the protective layer degrades and the effect of improving the image quality is saturated.

As a post-treatment liquid, an aqueous solution comprising components capable of forming a transparent protective layer over the print medium sheet S (e.g. a water-dispersible resin, a surfactant, water, and other additives as required) is preferably used. The water-dispersible resin in the post-treatment liquid preferably has a glass transition temperature (Tg) of −30° C. or higher, and more preferably in the range of −20° C. to 100° C. The minimum film forming temperature (MFT) of the water-dispersible resin is preferably 50° C. or lower, and more preferably 35° C. or lower. The water-dispersible resin is preferably radiation curable to improve the glossiness and fixability of the image. As the water-dispersible resin, for example, any one or more of an acrylic resin, a styrene-acrylic resin, a urethane resin, an acryl-silicone resin, a fluorine resin or the like, is preferably employed. The water-dispersible resin can be suitably selected from the same materials as that used for the inkjet ink. The amount of the water-dispersible resin contained, as a solid content, in the protective layer is preferably 1% by mass to 50% by mass. The surfactant used in the post-treatment liquid is not particularly limited and may be suitably selected from those used in the inkjet ink. Examples of the other components of the post-treatment liquid include antifungal agents, antifoaming agents, and pH adjustors.

Hitherto, the printing process was described such that the image formation step was performed in-line with the pre-treatment step (e.g. application of an (aqueous) pre-treatment liquid) and a drying and fixing step, all performed by the same apparatus, as shown in FIG. 1. However, the printing system 1 and the associated printing process are not restricted to the above-mentioned embodiment. A system and method are also contemplated in which two or more separate machines are interconnected through a transport mechanism 2, such as a belt conveyor 3, drum conveyor or a roller, and the step of applying a pre-treatment liquid, the (optional) step of drying a coating solution, the step of ejecting an inkjet ink to form an image and the step or drying an fixing the printed image are performed separately. Nevertheless, it is still preferable to carry out the image formation with the above defined in-line image forming method and printing system 1.

With reference now to FIG. 4 of the drawings, the inkjet printing system 1 according to the preferred embodiment of the invention is shown to include an apparatus 20 for determining suitable operating conditions for printing sheets S in a printing system and/or for optimizing the handling and/or printing of the sheets S in the printing system 1, and particularly for identifying and for classifying deformations D in the sheets S of print medium when the sheets S are on the transport path P of the printing system. In this particular embodiment, the apparatus 20 includes a sheet input module (not shown) for introducing a plurality of the sheets S into the printing system 1. Either in the sheet input module itself, or otherwise on the transport path P of the printing system 1, the sheets S may be exposed, either individually or collectively, to at least one physical operating condition or parameter of the printing system at one or more predetermined level or magnitude. Further, the apparatus 20 comprises a sensing unit 21, which processes the sheets S on the transport path P before those sheets S enter the image forming device 9. In this regard, it will be noted that the printing system 1 in FIG. 4 has a transport path P which includes both a simplex path $P_S$ and a duplex path $P_D$ and the sensing unit 21 of the apparatus 20 is arranged such that sheets S input on the simplex path $P_S$ and also returning on the duplex path $P_D$ all pass via the sensing unit 21.

At least one first sensor device 22 in the form of an optical sensor, such as a laser scanner, is provided within the sensing unit 21 for sensing the surface geometry or topology of the sheets S as they travel on a first pass or a second pass along the transport path P. The laser scanner or optical sensor device 22 generates digital image data I of the three-dimensional surface geometry or topology of each sheet S sensed or scanned. When performing the sensing or measuring of the surface geometry or topology of the sheets S on the transport path P of printing system 1 with the first sensor device(s) 22, it is highly desirable for the purposes of accuracy and reliability that the sheets S are transported or conveyed in the sensing unit 21 in substantially the same manner as those sheets S are later transported in the image forming unit or marking module 9. To this end, the sensing unit 21 includes a sheet conveyor mechanism 23 that simulates the sheet transport conditions provided by the transport mechanism 3' within the image forming unit 9. In this regard, both the conveyor mechanism 23 and the transport mechanism 3' include a belt transport device with vacuum sheet-holding pressure, as seen in FIG. 4.

The sheet topology data from the first sensor device 22 is then transmitted (e.g. either via a cable connection or wirelessly) to a controller 24 which includes a processor device 25 for processing and analysing the digital image data I to detect and to classify any defect or deformation D in the surface geometry or topology of each sheet S sensed or scanned. The sensing unit 21 is thus arranged to scan the sheets S for detecting and measuring any deformations or defects D before the sheets S enter the image forming device or inkjet marking module 9. In this way, if the processor device 25 determines that a sheet S on the transport path P includes a defect or deformation D that would render the sheet unsuitable for printing, the controller 24 is configured to prevent the sheet S from progressing to the inkjet marking module 9. The sensing unit 21 comprising the first sensor device(s) 22 is therefore desirably provided as a separate sentry unit positioned on the transport path P sufficiently upstream of the marking module 9. The controller 24 and processor device 25 may be integrated within the sentry unit 21 or they may be separately or remotely located.

Referring also to FIG. 5, some additional elements of the printing system 1 and the apparatus 20 are illustrated. For example, located immediately downstream of the first sensor device 22 in the sentry unit 21 is an additional sheet conveyor 23' that rotates and translates each sheet S on the transport path P before the sheet S passes removal device 26. It will also be noted that the printing system 1 includes a sheet registration entry unit 3" for regulating a position or orientation of each sheet S on the transport path P as the sheet S enters the image forming device 9.

Processing of the Data

The digital data I representing the surface geometry or topology of each sheet S and comprising an array of image pixels is processed and analysed in processor device 25. In a first processing step, a binary image is created where each pixel exceeding a pre-set height threshold given by TOL is set to 1, all other pixels are set to 0. The minimum height threshold level for detecting defects is preferably set to 400 µm, as it has been found that a lower level results in detection of too many very small, non-relevant defects. The processor device 25 produces a height map for each sheet S. This height map is used to detect and measure or classify any defects present within the sheet, and particularly any out-of-plane deformations D, such as wrinkles, dog ears, curl, tears etc. In this embodiment, a defect is defined as a measurement point or pixel within the height map having at least 4 connected neighbours also exceeding a pre-set threshold value.

Figure 6:
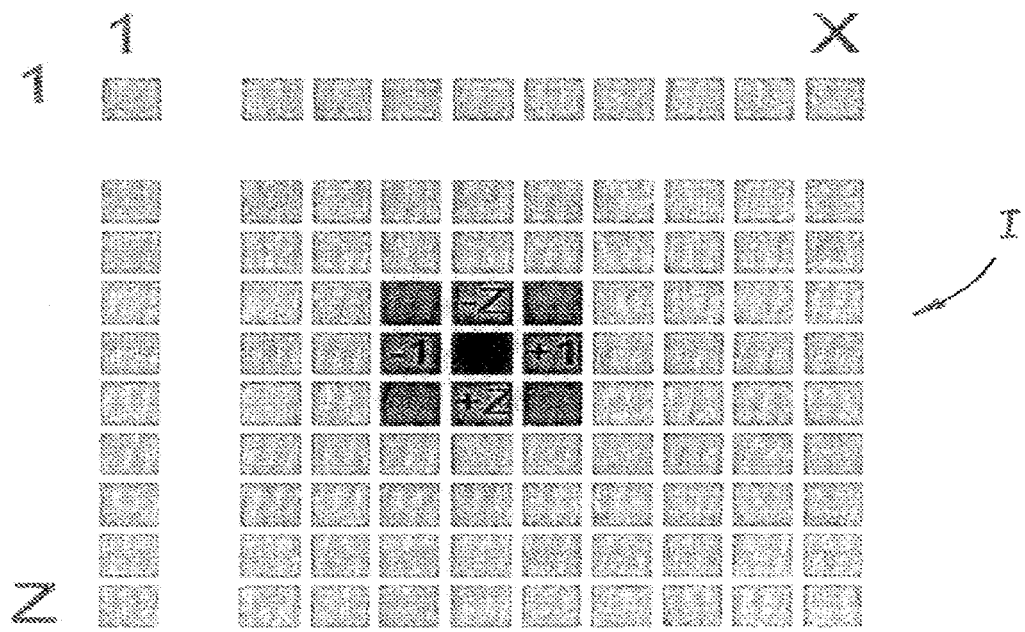
FIG. 6 is a schematic illustration of the analysis of an eight connected pixel neighbourhood in a preferred embodiment of the apparatus and method of the invention.

The defect analysis algorithm makes use of linear indexing for addressing the image content. This is convenient since all neighbour pixel locations can easily be determined by simply adding or subtracting a value from the current index. Each position in the image can be addressed as Image $(i*Z+j)$ where $i=1 \ldots Z$ and $j=1 \ldots X$. Addressing the four directly connected neighbours by offsets to the index is visualized in FIG. 6. Indeed, as shown in FIG. 6, an eight connected neighbourhood is used for the defect analysis or extraction, i.e. the corners are included. Thus, one of the steps in finding pixels that are part of the defect includes generating a pixel list of all neighbouring pixels of pixels known to form a part of the defect. As this algorithm can return the same index multiple times, however, it is desirable for this list of indices to be cleaned by removing all duplicate indices. This prevents unnecessary calculations and multiple inclusions of the same data, which would otherwise cause errors in the calculation of defect properties. The function used to determine whether a pixel forms part of the defect is combined within this filter step. The algorithm used for removing double entries uses a simple approach, which may not offer the highest performance. However, as the number of defects within a sheet S is limited and the number of pixels within a defect is usually small, this approach does not consume too much calculation time. Otherwise a filter function using a hash algorithm may offer higher performance.

Figure 7:
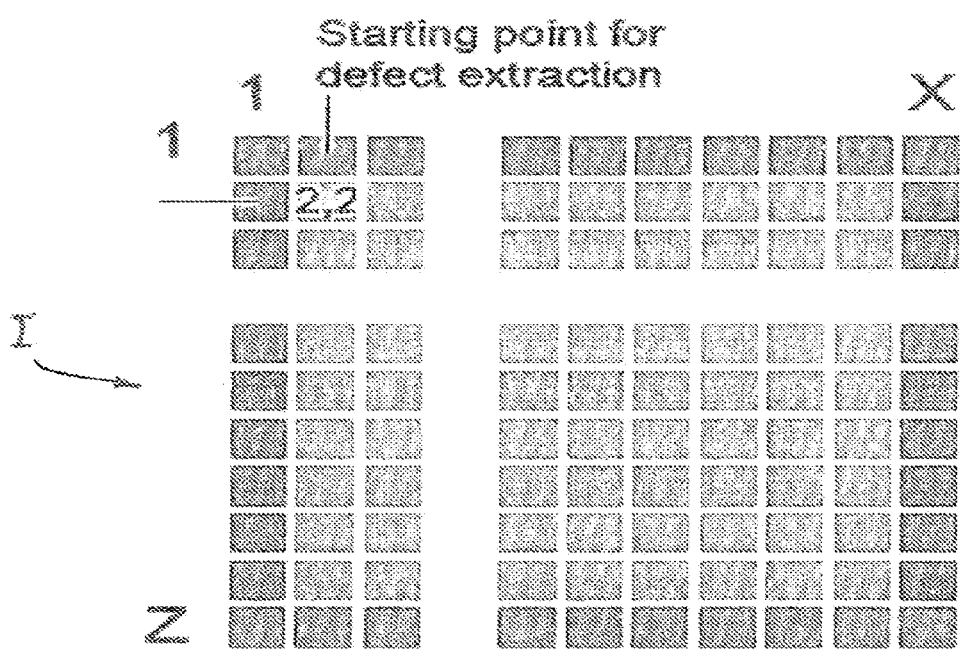
FIG. 7 is a schematic illustration of pixels on edges of the image data which are assigned a value below the defect threshold before the analysis process starts.

With reference to FIG. 7, the image pixels on the image edges are assigned a value below the defect threshold before the defect analysis process starts to prevent generation of invalid indices. The defect analysis or extraction thus starts at image element 2,2. By virtue of this value assignment, an image element on the edges of the height map will never be assigned to a defect area and the algorithm will never try to index its neighbours. Thus, in order to avoid defects D at an edge of the sheet S not being measured or classified correctly, the edge of the sheet S should not be located at the edge of the image. As an alternative the size of the image containing the height map could be increased along all sides by one pixel containing a value less than the threshold value for defect extraction.

Figure 8:
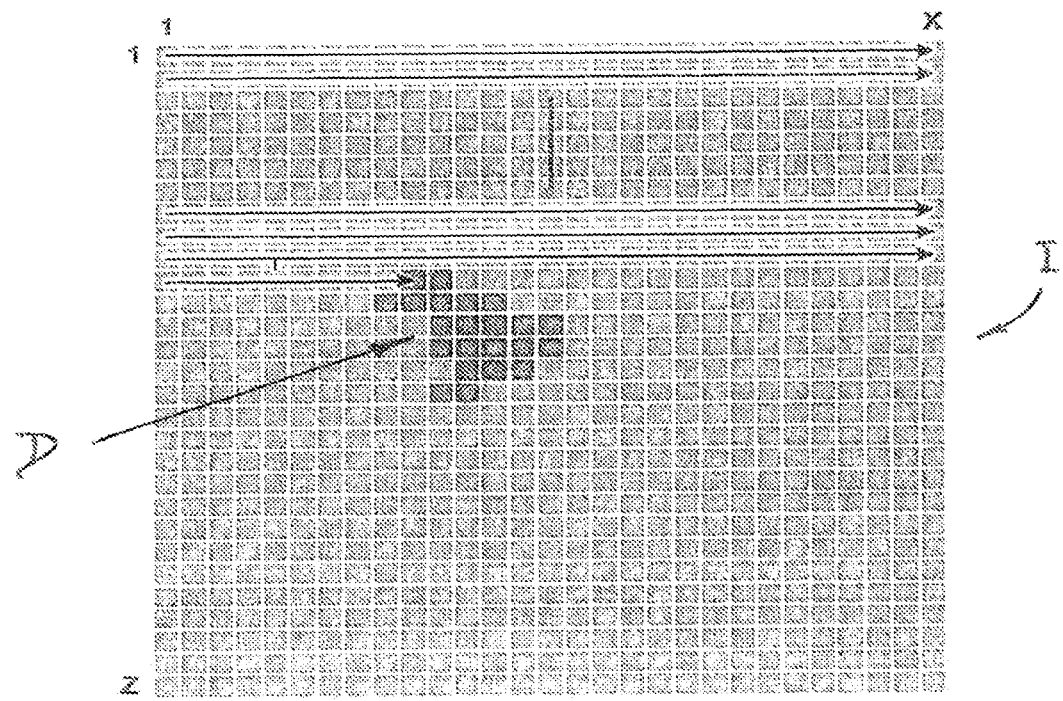
FIG. 8 is a schematic illustration of the image data in the embodiment of the apparatus and method of the invention being analysed by row major until a data pixel representing a deformation is found, at which point all of the pixel neighbours are assessed.
Figure 9:
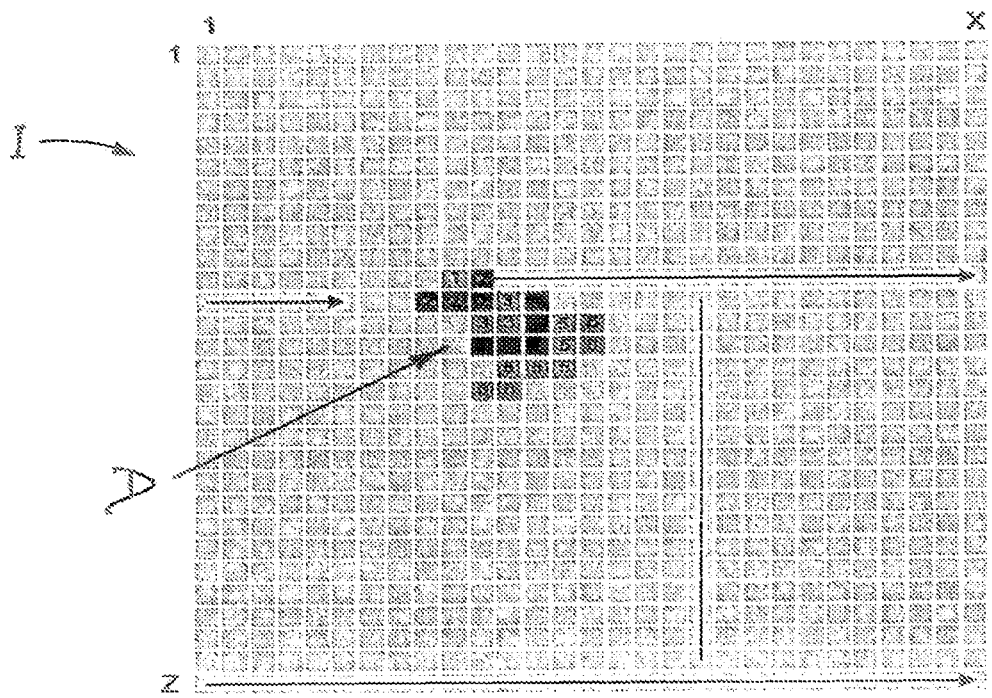
FIG. 9 is a schematic illustration of the image data in FIG. 8, with the pixel neighbours within the deformation analysed, the numbers indicating the iteration steps, and the analysis for new defects continuing when all pixels within the deformation have been found.

Referring to FIG. 8, the image pixel data I from the sensor device 22 is analysed by the processor 25 row-by-row or "row major" until a defect pixel is detected. Starting at this point, all immediately adjacent or neighbouring pixels are then tested to see if they belong to the defect, as shown in FIG. 9. The neighbouring pixels within the defect are tested, with the pixel numbering in FIG. 9 indicating the iteration steps. Further analysing the image pixel data I row-by-row for new defects then continues when all pixels within a defect or deformation D have been found. To perform a measurement and classification of a defect D and/or for later statistical analysis of the defects, the following defect properties are assessed:

Maximum Height: The highest point H within the defect

Defect Area, A: The area A is equal to the number of pixels that belong to the defect or deformation D, which is the sum of the unique pixels found during each iteration of the defect search algorithm.

Bounding Box, B: The bounding box is identified by the top left Z, X coordinates and width in both directions Centre of Gravity, C:

$$C = \frac{1}{M}\sum_{i=1}^{n} m_i r_i$$

where M is the accumulated height (total mass) of the defect, $m_i$ is the height of individual pixels within the defect, and $r_i$ is the pixel coordinates (z, x)

Figure 10:
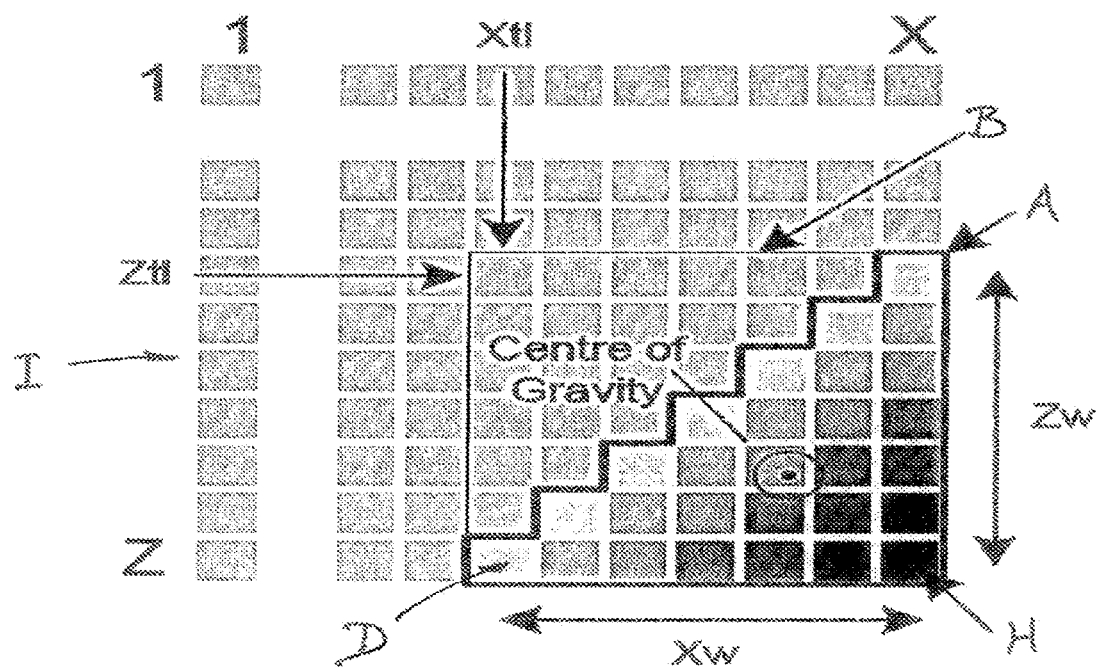
FIG. 10 is a schematic illustration of various properties for a dog-ear type of sheet deformation.

With reference to FIG. 10 of the drawings, the properties for a dog ear type of defect are illustrated. These properties for the dog-ear defect include: maximum height H located at corner of bounding box B, a centre of gravity C located near a diagonal of the bounding box B, and an area A of approximately 50% of bounding box area.

The defect properties belonging to the current defect being processed are updated each time a new list of neighbour pixels has been found. Since the properties are quite simple, the processing is straight-forward. The most 'complex' property is the centre-of-gravity C. During the defect extraction, the sum of the individual Z and X and total weights is calculated. After all pixels belonging to the defect have been found, the centre-of-gravity can be calculated from these three values. During the defect analysis or extraction process, the defect properties are determined for all defects found. When the analysis for a specific defect is finished, its characteristics can be used to determine whether the defect is to be included in the defect list or not. The characteristics for a maximum number of defects (e.g. 20) may be stored. Defects detected having an area of less than 10 pixels may be neglected as these are most likely just noise elements or the fringes of a real defect. Fringe defects are mainly caused by noise within the height map. Most fringe defect areas are smaller than 3 pixels. The largest fringe defect area may be 7 pixels in area. Thus, the defect area A will be used to report defects only when their area is equal to or greater than 10 pixels.

Another approach for the elimination of small defects may be to filter the image data I before defect analysis. There are several options for doing this, including:

(i) Removing all defects containing less than a predefined number of pixels. A drawback here is that a defect must first be identified, so performing this operation separately will consume more processing time.

(ii) Performing a dilation operation before defect detection. This can help to 'remove' small fringe defects. Such fringe defects are merged into a larger defect.

(iii) Performing an erosion operation before defect analysis or detection. This can remove small defects. The maximum size of the defects that will effectively be removed is determined by the size and shape of the erosion kernel. It is not yet clear if the small fringe type defects will be removed. The larger the filter kernel the more processing time is needed.

Print System Control

With reference again to FIGS. 4 and 5, after the image data I has been analysed by the processor 25 and the defects or deformations D within the sheet S have been extract and classified accordingly, the controller 24 may transmit a control signal (e.g. either via cable or wirelessly) to a removal device or ejector device 26 for regulating the transport or conveyance of the sheets S to the image forming device or inkjet marking module 9. In particular, if the sheet S has been determined by the processor 25 to include one or more deformations D with a size or extent above a predetermined threshold sufficient to render the sheet unsuitable for printing, the controller 24 is configured to control or operate the removal device 26 to remove or eject the sheet S from the transport path P to a reject tray 27. The controller 24 controls sheet removal or rejection via the removal device 26 on the basis of a sheet form detection result from the processor device 25 compared with at least one predetermined rejection criterion. This rejection criterion is typically defined by a maximum allowable height H of a detected deformation D out of the plane of the sheet S because in an inkjet printing system 1 the passage of the sheet S through the narrow print gap under the printing heads 101-107 is most critical. In particular, while a larger print gap in inkjet applications provides robustness against sheet deformations or sheet jams, it results in a lower print quality, so the print gap is often kept as small as practicable.

In this way, sheet jams within the print module or image forming device 9 may be avoided when sheets S are found to contain too much deformation. The removal device 26 located between the sentry unit 21 and the inkjet marking module 9 can employ different means suitable or optimized for redirecting the sheets S from the transport path P towards the reject tray 27. In this particular embodiment, rollers are used. In principle, control of the removal device or ejector device 26 by the controller 24 can be based solely upon one predetermined criterion to perform its job, such as a maximum allowable deformation height or size. However, information gathered on deformation of the sheet S may also be used for statistical purposes to determine media run-ability. For statistical purposes more information is generally useful, such as a number of the deformed areas or defects D present within a sheet S, the area A of each defect D, etc. The classification data may be stored in, and later retrieved from, the controller 24 for further analysis. The predetermined rejection criterion in the apparatus 20 is varied depending on the operating parameters or conditions of the printing system 1, e.g. one or more of: a material of the sheet S; an operating mode of the printing system (e.g. a high productivity mode or a high print-quality mode); a position of the deformation D on the sheet S (e.g. leading edge, trailing edge, middle of sheet), a shape or type of the deformation D (e.g. a dog-ear, waviness, or a curl), and/or whether the sheet S is on a simplex pass or a duplex pass of the transport path P.

In this regard, the impact of removing or ejecting a sheet S on the duplex pass is often higher than removing or rejecting the sheet S on the simplex pass because sheet removal on the duplex pass results in a missing page in the output, and duplex sheets following a removed or rejected sheet also need to be removed to ensure that the printed images are in the correct order in the final output. Thus, it is possible that the printing system 1 may have different modes of operation, such as a high-productivity mode (e.g. with higher rejection threshold criterion on the duplex pass) or a high-print-quality mode (e.g. with lower rejection threshold criterion on the duplex pass). Also, the likelihood of sheet damage or deformation occurring on the duplex pass typically depends on the material or print medium of the sheet, so here again it is possible to set a unique simplex and duplex threshold for each material or print medium type. In addition, it is possible to vary the predetermined criterion based on defect location within the sheet S (e.g. leading edge, trailing edge, middle of sheet), or based on the type of defect (e.g. dog-ear, waviness, or curl). In this regard, it will be noted that a higher threshold criterion for trailing edge defects and/or for waviness on a side edge of the sheet S may be tolerated because these are less likely to cause a sheet jam. Thus, unlike prior art systems in which the same rejection criterion is applied regardless of the printing application or printing parameters, the system of the present invention is able to be selected or optimized according to variable applications and requirements. In other words, having one or more variable criteria provides a system which is adaptable depending on the application.

At least one second sensor 28 for sensing the surface geometry or topology of the sheet S located within the image forming unit 9 can be used to provide feedback or correlation data I' to the sentry unit 21 or to the controller 24 to increase the accuracy of the measurement of the sheet deformation D. Various parameters affecting the simulated transport conditions via the sheet conveyor mechanism 23 in the sentry unit 21 can be changed using this feedback signal to improve or optimize the prediction result. Several sensing or measurement techniques can be used to sense or measure sheet deformation D. A two-dimensional (2D) laser triangulation sensor can create a three-dimensional (3D) sheet image when the sheet S passes the first and/or second sensor devices 22, 28. The second sensor device 28 used to provide feedback data does not necessarily need to be identical to the first sensor device 22 used within the sentry unit 21. A one-dimensional (1D) sheet height sensor using a collimated light sheet can be used to measure the sheet profile perpendicular to the direction of travel along the transport path P. In addition to improving the accuracy of the sensing unit 21, the feedback system via the second sensor device(s) 28 can be used for improving or optimizing system productivity. In this regard, too many sheets will be rejected if the pre-set defect criteria are too sensitive, while too much print quality degradation and/or too many sheet jams will occur if the pre-set defect criteria are not sensitive enough. Accordingly, the sheet rejection threshold can be improved or optimized using the second measurement on the print belt 3', especially in situations where the sheet deformation D changes between sentry unit 21 and image forming unit 9.

With the apparatus 20 of this embodiment, the printing system 1 can be adjusted for improved or optimized handling or runability of the sheets S for given or selected operating conditions or operating parameters. That is, the controller 24 can be adjusted to vary the predetermined rejection criterion or threshold for the sheets, and/or the print gap in the heads 101-107 of the image forming unit 9 may also be adjusted for sheet deformations D of different size. As will be more clear from the following examples, one or more operating condition or parameter of the printing system 1 may be selected from the group of: (i) temperature, e.g. within a range of about 50° C. to about 120° C.; (ii) relative humidity, e.g. within a range of about 10% to about 90%; (iii) ink coverage of the sheet S, e.g. within a range of about 0 g/m$^2$ to about 20 g/m$^2$; (iv) framing distance of a sheet, e.g. within a range of about 0 mm to about 50 mm; (v) under-pressure of a sheet transport system 3, 3', 23, 23' in the printing system 1; and (vi) transport speed of the sheet transport system 3, 3', 23, 23'. In this regard, the sheets S introduced into the printing system 1 are exposed, either individually or collectively, to the physical operating condition or parameter at one or more predetermined level or magnitude thereof. In the case of the operating conditions of temperature and/or relative humidity, for example, this may take place in the sheet input module (not shown). Alternatively, the sheets may be exposed, either individually or collectively, to the physical operating condition or parameter elsewhere in the printing system 1. The sensing unit 21 senses the surface geometry or topology of each sheet S via the sensor(s) 22 and generates data I representative of that surface geometry or topology for each predetermined level or magnitude of the respective physical operating condition or parameter. The processor device 25 then processes that data I from the sensor device(s) 22 to detect and classify deformations D in the surface geometry or topology of each sheet S and can correlate these deformations D to each level or magnitude of the respective physical operating condition or parameter.

EXAMPLE 1

This example employs the apparatus 20 to determine suitable or optimum runability of the printing system 1 by determining loading instructions for the sheet input module.

Firstly, the sheets S of print medium (e.g. paper) are introduced into the input module with a first side of the sheet facing up. The print heads 101-107 do not print an image onto the sheets. The sheets of paper are exposed to and heated to a temperature of 70° Celsius (or another temperature chosen in the range of 50° to 120° Celsius) in the printing system 1 and then transported (e.g. within 5 to 15 seconds) to the sensing unit 21, where an out-of-plane geometry is sensed and the height H of deformations D subsequently measured in the processing device 25 by analysis of the sensor data I. The same procedure is then repeated, but with the other side of the sheets S. The deformation heights H determined for both sides of the sheet are then compared to a threshold value (i.e. related to the print gap). The lowest maximum defect or deformation height H determines which side of the sheet is to face up during printing for minimizing risk of a head-touch during printing, i.e. in simplex or duplex printing. This determination of which side of the sheets should face upwards thus forms a loading instruction for the sheet input module.

If the maximum heights H of deformations D measured for both sides of a sheet S are above the threshold value, it is possible that the sheet S cannot be run in the printing system 1 and must be removed via the ejector device 26. If, on the other hand, no out-of-plane deformation D is detected or measured for either side of a paper sheet S, loading instructions are not required.

EXAMPLE 2

This example employs the apparatus 20 to determine suitable or optimum runability of the printing system 1 by determining a maximum allowable ink coverage and for minimizing defects or deformations D of the print medium. Firstly, the sheets S of the print medium (e.g. paper) are introduced into the sheet input module of the printing system with one side of the sheet facing up. A specific image (e.g. 12 squares, or a single large square covering the total side of the sheet with small edge framing) is jetted onto separate sheets S of the paper with different levels of ink coverage (e.g. 1, 2, 3, 4, 5, 6, 7, 8, 9, 10, 11, 12, 13, 14, 15, 16, 17, 18, 19, 20 g/m$^2$) via the print heads 101-107. A number of these sheets S (e.g. selected in the range of 20 to 1000) are then exposed to and heated to a temperature of about 70° Celsius (or another temperature selected in the range of 50° to 120° Celsius), and transported (e.g. within 5 to 15 seconds) to the sensing unit 21 where the surface geometry or topology of the sheets S is sensed by one or more first sensors 22 and a height H of detected defects D is subsequently measured in the processing device 25 by analysis of the sensor data I.

Thereafter, the same procedure is repeated with the other side of the sheets. The heights H of the deformations D at each of the levels of ink coverage determined for both sides of the sheets S are then compared to a threshold value (i.e. related to the print gap). The deformation height H of the two sides of the sheet S (with same ink coverage) closest to and below the threshold value determines the ink coverage level on the sheet S allowable for minimizing the risk of a head-touch in simplex and/or duplex printing. Again, in the event that the maximum height H of the deformations D measured on both sides of the sheet S for all ink coverage levels is above the threshold value, it is possible that the sheet S cannot be run in the printing system. The method of this particular example may be simplified by testing only one side of the sheets S. In this regard, the side of the sheets S to be tested may be determined or selected based on the example 1 above or based on example 3 below.

EXAMPLE 3

This example employs the apparatus 20 to optimize the runability of the printing system 1 by determining the maximum fixation temperature, and for minimizing sheet deformations D with or without ink coverage. Firstly, sheets S of the print medium (e.g. paper) are introduced via an input module into the printing system with one side of the sheets S facing up. A specific image (e.g. 12 squares, or a single large square covering substantially or almost an entire side of the sheet with only small or minimal edge framing) is jetted or printed onto each sheet S via the print heads 101-107 of the image forming unit 9 with an ink coverage of 15 g/m$^2$ (or another ink coverage selected in the range from 0 to 20 g/m$^2$). A number of the sheets S (e.g. selected in the range of 20 to 1000) are then heated to 50° Celsius, and then transported (e.g. within 5 to 15 seconds) to the sensing unit 21 where the surface geometry of the side of the sheet S is sensed by sensors 22 and a height H of detected deformations D subsequently measured in the processing device 25 by an analysis of the sensor data I. Thereafter, the same procedure is repeated with the other side of the sheet S facing up in the input module. Following this, the above steps are performed again, but with each of the sheets S exposed to, and heated to, higher temperatures (e.g. 55°, 60°, 65°, 75°, 80°, 85°, 90° Celsius, etc.). The heights H of the deformations D detected at each of the different temperatures for both sides of each sheet S are then compared to a threshold height value (i.e. related to the print gap). The deformation height H of the two sides of a sheet S (for the same temperature) closest to and below the threshold value determines the fixation temperature level for the sheet S (and ink) in the printing system 1 for minimizing the risk of a head-touch in simplex and/or duplex printing.

If the maximum height H measured on both sides of the sheet S for all of the temperature levels is above the threshold value, it is possible that the sheets S cannot be run in the printing system 1. The method of this example may be simplified by testing only one side of the sheets, e.g. by selecting or determining a side of sheets based on example 1 or example 2 above.

EXAMPLE 4

This example employs the apparatus 20 to optimize the runability of the printing system 1 by determining a maximum framing distance for minimizing print medium deformation with ink coverage. Firstly, the sheets S of print medium (e.g. paper) are introduced into the sheet input module with a first side of the sheet facing up. A specific image of one large square covering substantially one full side of each sheet S with an edge framing of 5 mm (i.e. the edge region of the sheets S of print medium that is not printed) is jetted on sheets S of media/paper via the print heads 101-107 with an ink coverage of 15 g/m$^2$ (or another ink coverage chosen in the range of 0-20 g/m$^2$). A number of the sheets S (e.g. selected in the range of 20 to 1000) are then heated to 70° Celsius (or another temperature selected between 50° and 120° Celsius), and then transported (e.g. within 5 to 15 seconds) to the sensing unit 21 where the surface geometry or topology of that side of the sheet S is sensed by sensors 22 and a height H of detected deformations D subsequently measured in the processing device 25 by an analysis of the sensor data I. There-after, the same procedure is repeated with the other side of the sheet S facing up in the input module. Following this, all of these steps are performed again, but this time with the sheets S having a smaller edge framing (e.g. 4 mm, 3 mm, 2 mm, 1 mm, 0 mm).

The heights H of defects D detected at each of the different framing distances are then compared to a threshold value (i.e. related to the print gap). The height H of the defects or deformations D detected on both sides of the sheets S (for the same framing distance) lying closest to and below the threshold value then determines the framing distance for the sheet S for minimizing the risk of a head-touch during simplex and/or duplex printing in the printing system 1. If the maximum height H measured for all framing distances is above the threshold value, it is possible that the sheets S cannot be run in the printing system 1. The method of this example may be simplified by testing only one side of the sheets S, e.g. by choosing one side of sheet S as determined by the method of example 1, 2 or 3 above.

EXAMPLE 5

This example employs the apparatus 20 to optimize the runability of the printing system 1 by determining a minimum and maximum humidity in the sheet input module for minimizing print medium deformation. Firstly, the sheets S of the print medium (e.g. paper) are introduced into the input module with a first side of the sheets S facing up. The sheets are exposed to a relative humidity (RH) of 20% in the input module for a period of 60 minutes (or alternatively for another time period in the range of 5 minutes to 24 hours). A number of the sheets S (e.g. in the range of 20 to 1000) are then transported (e.g. within 5 to 15 seconds) to the sensing unit 21 where the surface geometry or topology of that upward side of the sheet S is sensed by sensors 22 and a height H of detected deformations D subsequently measured in the processing device 25 by an analysis of the sensor data I. There-after, the same procedure is repeated with the other side of the sheet S facing up in the input module. Following this, the above steps are performed again, but with the sheets S exposed to a different RH in the input module (e.g. 25%, 30%, 35%, 40%, 45%, 50%, 55%, 60%, etc.). The heights H of the defects or deformations D detected at each of the different % RH (where they are the same for both sides of each sheet S) are then compared to the threshold height value (i.e. related to the print gap). The height of the deformations D detected on both sides of the sheets (for the same % RH) lying closest to and below the threshold value determines the maximum and minimum % RH for use with that print medium (paper) for minimizing a risk of a head-touch in simplex and/or duplex printing in the printing system 1. If the maximum height H measured for a % RH is above the threshold value, it is possible that the sheets S cannot be run in the printing system 1.

Other examples of operating parameters that can be determined using procedures similar to those above include print speeds and de-curler settings. The setting closest to and below the threshold value can be chosen for minimizing risk of a head-touch in duplex printing. Procedures can be performed with different settings from normal print job settings in the deformation height measurement system to increase or decrease the height or accuracy of to be measured media. Because the form of the sheet S may vary during their travel along the transport path P after sentry unit 21 and up to the printing transport conveyor 3' (e.g. curl or waviness variation due to humidity change), an optional criterion for parameter choice is to minimize variation in the deformation height H between sentry unit 21 and printing conveyor 3', i.e. as sensed by the second sensor 28.

Figure 11:
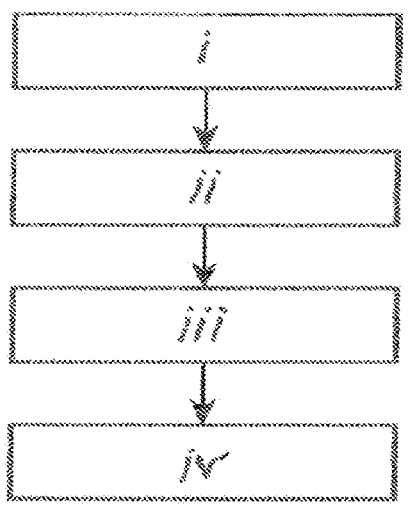
FIG. 11 is a flow diagram which schematically illustrates a method according to a preferred embodiment.

Referring now to FIG. 11 of the drawings, a flow diagram is shown that schematically illustrates the steps in a method of determining suitable operating conditions for printing sheets in a printing system 1 according to a preferred embodiment of the invention described above with respect to FIGS. 1 to 10. In this regard, the first box i of FIG. 11 represents the step of introducing a plurality of sheets S into the printing system 1, and especially into a sheet input module of the printing system. The second box ii represents the step of treating the sheets S by exposing the sheets S, either individually or collectively, to at least one and preferably a plurality of operating conditions or parameters (such as temperature, relative humidity, and/or ink coverage) of the printing system 1 at one or more predetermined levels or magnitudes. The third box iii then represents the step of sensing a surface geometry or a topology of a sheet S to be printed via a first sensing device 22 (e.g. a laser scanner) as the sheet S travels along the transport path P to generate data I representative of that surface geometry or topology for each predetermined level or magnitude of the respective physical operating condition(s) or parameter(s). The final box iv in drawing FIG. 11 represents the step of processing the surface geometry or topology data I generated to identify and classify deformations D in the surface geometry or topology of the sheet S for each level or magnitude of the respective physical operating condition or parameter, e.g. using the processor device 25. The method then typically includes calibrating a print gap of the print heads 101-107 in the image forming unit 9 of the printing system 1 to prevailing or desired operating conditions or parameters for achieving an improved or optimized runability or handling of the sheets S. In this regard, the method will typically include correlating a threshold size or extent of a detected deformation D to each predetermined level or magnitude of the respective physical operating condition or parameter.

Figure 12:
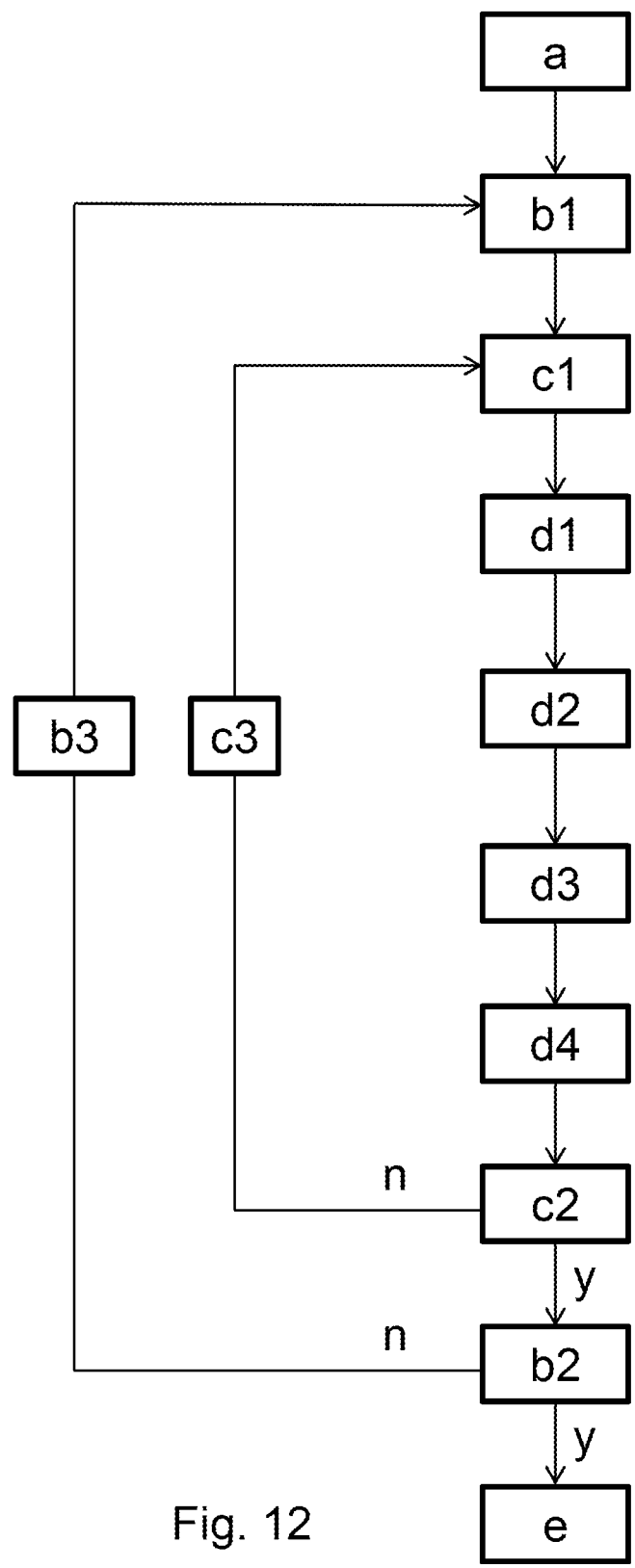
FIG. 12 is a flow diagram which schematically illustrates a further method according to a preferred embodiment.

Finally, referring to FIG. 12 a flow diagram of a further embodiment of a method according to the present invention is illustrated. The individual steps of a method according to the present invention are indicated by their respective boxes in FIG. 12.

In step a, the relevant operating conditions of the printing system are selected, for example temperature, humidity and ink coverage. For each of these selected operating conditions a plurality or range of levels is selected. The levels may be spaced at in equal and discrete steps across the range for each operating condition. For example, the temperature range is 50 to 150° C., and varied in steps of 10° C. Thus, in the step a the number of operating condition to be varied is determined as well as the number of levels for each operating condition.

In step b1, an operating conditions is selected, wherein in the step c1, a level of the operating condition selected in step b1 is selected. In the example of the temperature range, the selected level may be e.g. 100° C.

The sheet S in step d1 is then exposed to said operating condition selected in step b1 at the level selected in step b1. In the example of the temperature range, the sheet level is heated to 100° C. The exposure may be performed in the sheet input module and/or the image forming unit. This exposure may introduce deformations or defects in the sheets.

In step d2, the sheet exposed in step d1 is sensed by the sensing unit 21 to determine a height map of the sheet's surface. The sensing unit generates data I represent said height map. The data I additionally comprise information related to the operating condition selected in step b1 and its level selected in step c1.

Optionally, the data may be analyzed in step d3. Using the height map data I, the processor device 21 may detect and determine deformations in the sheet. Preferably, a plurality of properties, such as maximum height, for each detected deformation are determined by the processor device, such that these properties allow the processor device to classify the deformations in a plurality of classes (or defect types). As such, the data I can be stored in an organized format for quick analysis.

In the optional step d4, the data I may be stored in a memory unit. The stored data sets may comprise height map related information and information for identifying for the level of the operating condition to which the sheet was exposed.

In step c2, the processor device checks whether all steps or levels in the range of the operating condition selected in step b1 were performed. If not, the level of the operating parameter is adjusted in step c3, e.g. increased or decreased by a step. The steps c1, d1-d4, and c2 are then repeated to obtain data I for the adjusted level of the operating parameter. In this manner, the range or plurality of levels for an operating condition determined in step a is scanned. When all steps in a range have performed, the processor checks whether all relevant operating conditions as determined in step a have been performed. If not, the operating condition is adjusted in step b3, e.g. after completing a temperature scan or variation, a humidity scan or variation is performed. Steps b1, c1, d1-d4, c2, and b2 are then repeated until all operating conditions have been processed. The method then preferably performs step e.

In step e, the data I for each level for each operating condition are compared to a reference to determine the suitable operating conditions. The data I can be compared to each other to compare e.g. maximum sheet heights, numbers of deformations, and/or deformations distribution. Additionally or alternatively, the data I may be compared to a at least one reference value, for example the print head gap spacing. Preferably, the at least one reference value determines an upper and/or lower limit for certain properties determined by the processor unit, for example a top limit for the maximum sheet height. In a basic embodiment, the relative suitability for printing of a sheet exposed to a first each level of an operating condition is compared to that a sheet exposed to a second each level of that operating condition. The level with the higher suitability for printing is deemed as the suitable level for that operating condition, at least until a higher suitability for printing is determined for a third level of that operating condition. As such, the processor may compare the data sets in pairs, eliminating the need for storing all the data sets. The comparison step e in FIG. 12 is illustrated as the final step, but a comparison may be made at any step or time during the method according to the present invention, when at least two data sets for different levels of an operating condition are available.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

LIST OF REFERENCE SIGNS 1 printing system
2 transport mechanism
3 conveyor belt
3' conveyor belt
3" registration entry unit
4 first pre-treatment module
5 pre-treatment liquid applicator device
6 storage tank
7 roller
7' roller
8 dryer device
9 image forming device or inkjet marking module
90 inkjet nozzle
91 inkjet marking device
92 inkjet marking device
93 inkjet marking device
94 inkjet marking device
101 inkjet head
102 inkjet head
103 inkjet head
104 inkjet head
105 inkjet head
106 inkjet head
107 inkjet head
10 temperature control device
11 drying and fixing unit
20 apparatus
21 sentry unit
22 first sensor device
23 conveyor mechanism
23' conveyor mechanism
24 controller
25 processing device
26 ejector device
27 reject tray
28 second sensor device
d nozzle pitch
S sheet of print medium
P transport path
$P_S$ simplex transport path
$P_D$ duplex transport path
R printing range
O overlap of inkjet printer heads I image data
D defect or deformation
B bounding box
H maximum height
A defect area
C centre of gravity

The invention claimed is:

1. A method of determining suitable operating conditions for printing sheets in a printing system, comprising a controller performing the steps of:
   introducing a first sheet into the printing system;
   selecting a first level for a physical operating condition of the printing system;
   exposing the first sheet to the physical operating condition of the printing system at the first level to treat the first sheet;
   sensing a surface geometry of a surface of the exposed first sheet to generate first height map data representing a height map of the surface of the exposed first sheet for the first level of the operating condition;
   introducing a second sheet into the printing system;
   selecting a second level for the physical operating condition of the printing system;
   exposing the second sheet to the physical operating condition of the printing system at the second level to treat the second sheet;
   sensing a surface geometry of a surface of the exposed second sheet to generate second height map data representing a height map of the surface of the exposed second sheet for the second level of the operating condition;
   comparing the first height map data and the second height map data to determine a suitable level of the operating condition of the printing system; and
   selecting the determined suitable level as a printing setting for the operating condition of the printing system.

2. The method according to claim 1, further comprising the step of the controller setting the operating condition of the printing system to the determined suitable level.

3. The method according to claim 1, wherein the step of comparing further comprises comparing the first height map data and the second height map data to a reference to determine a suitable level of the operating condition of the printing system.

4. The method according to claim 3, wherein the reference comprises a threshold value related to the print head gap spacing which threshold value, when exceeded, renders a sheet unsuitable for printing.

5. The method according to claim 4, wherein:
   the step of sensing the surface geometry of a surface of the exposed first sheet comprises determining a first maximum sheet height of the first sheet for the first level of the operating condition;
   the step of comparing comprises comparing the first maximum sheet height for the first level of the operating condition to the threshold value;
   the step of sensing the surface geometry of a surface of the exposed second sheet comprises determining a second maximum sheet height of the second sheet for the second level of the operating condition;
   the step of comparing further comprises comparing the second maximum sheet height for the second level of the operating condition to the threshold value.

6. The method according to claim 1, further comprising the step of comparing the first height map data and the second height map data to determine a suitable print head gap spacing of a print head of the printing system.

7. The method according to claim 1, further comprising the step of storing the first height map data,
   wherein the step of comparing comprises comparing the second height map data to the stored first height map data.

8. The method according to claim 1, wherein the operating condition of the printing system includes temperature and the first level and the second level of the temperature lie within the range of about 50° C. to about 120° C.

9. The method according to claim 1, wherein the operating condition of the printing system includes relative humidity, and wherein the first level and the second level of the relative humidity lie within the range of about 10% to about 90%.

10. The method according to claim 1, wherein the operating condition of the printing system includes ink coverage of a first sheet, and wherein the first level and the second level of the ink coverage lie within the range of about 0 g/m$^2$ to about 20 g/m$^2$.

11. The method according to claim 1, wherein the operating condition of the printing system includes framing distance of a first sheet, and wherein the first level and the second level of the framing distance lie within the range of about 0 mm to about 50 mm.

12. The method according to claim 1, wherein the operating condition of the printing system includes under-pressure or transport speed of a sheet transport system.

13. The method according to claims 1, further comprising the step of exposing a plurality of sheets to the operating condition of the printing system at a plurality of predetermined levels, wherein the plurality of predetermined levels are substantially regularly spaced across a range.

14. A method of determining suitable operating conditions for printing sheets in a printing system, comprising a controller performing the steps of:
   introducing a first sheet into the printing system;
   selecting a first level for a physical operating condition of the printing system;
   exposing the first sheet to the physical operating condition of the printing system at the first level to treat the first sheet region;
   sensing a surface geometry of a surface of the exposed first sheet to generate first height map data representing a height map of the surface of the exposed first sheet for the first level of the operating condition;
   introducing a second sheet into the printing system;
   selecting a second level for the physical operating condition of the printing system;
   exposing the second sheet to the physical operating condition of the printing system at the second level to treat the second sheet region;
   sensing a surface geometry of a surface of the exposed second sheet to generate second height map data representing a height map of the surface of the exposed second sheet for the second level of the operating condition;
   comparing the first height map data and the second height map data to determine a suitable level of the operating condition of the printing system;
   selecting the determined suitable level as a printing setting for the operating condition of the printing system.

* * * * *